US012697734B2

(12) United States Patent (10) Patent No.: US 12,697,734 B2

Hoffman et al. (45) Date of Patent: Aug. 4, 2026

(54) IMAGE-BASED GUIDANCE FOR ROBOTIC WIRE PICKUP

(71) Applicant: The Boeing Company, Arlington, VA (US)

(72) Inventors: Heiko Hoffman, Simi Valley, CA (US); Jeffrey A. McCaskey, Everett, WA (US); Lars E. Blacken, Bothell, WA (US); Bradley J. Mitchell, Snohomish, WA (US); Damien O. Martin, Everett, WA (US)

(73) Assignee: The Boeing Company, Arlington, VA (US)

( * ) Notice: Subject to any disclaimer, the term of this patent is extended or adjusted under 35 U.S.C. 154(b) by 18 days.

(21) Appl. No.: 18/915,333

(22) Filed: Oct. 14, 2024

(65) Prior Publication Data

US 2025/0033216 A1 Jan. 30, 2025

Related U.S. Application Data

(63) Continuation of application No. 17/492,562, filed on Oct. 2, 2021, now Pat. No. 12,145,280.

(60) Provisional application No. 63/142,112, filed on Jan. 27, 2021.

(51) Int. Cl.
  B25J 9/16 (2006.01)
  B25J 13/08 (2006.01)
  H01R 43/052 (2006.01)

(52) U.S. Cl.
  CPC ........... B25J 9/1697 (2013.01); B25J 9/1612 (2013.01); B25J 9/1653 (2013.01); B25J 9/1664 (2013.01); B25J 13/089 (2013.01); H01R 43/052 (2013.01)

(58) Field of Classification Search
  CPC .... B25J 9/1697; B25J 9/1612; B25J 15/0038; B25J 13/089; G05B 2219/40584; H01R 43/052
  See application file for complete search history.

(56) References Cited

U.S. PATENT DOCUMENTS

2014/0143991 A1* 5/2014 Windprechtinger ... B25J 9/1638
                                                              29/889.7
2019/0329403 A1* 10/2019 Ueda ..................... B25J 15/0052

(Continued)

*Primary Examiner* — Wade Miles
*Assistant Examiner* — Mohammed Yousef Abuelhawa
(74) *Attorney, Agent, or Firm* — Yee & Associates, P.C.

(57) ABSTRACT

Systems and methods for automated wire pickup using image-based robot guidance. The machine vision-based system includes: a robot arm; a tool head coupled to the distal end of the robot arm and including a wire gripper motor; a wire gripper movably coupled to the tool head and operatively coupled to the wire gripper motor; a wire holder configured for clamping a wire; camera means mounted to the distal end of the robot arm and having first and second fields of view which intersect in a volume of space that includes the tip of the wire gripper and the wire holder; and a computer system configured to control operation of the robot arm motors and wire gripper motor. More specifically, the computer system is configured for visually estimating the position and orientation of a contact-equipped wire being held by the wire holder and then generating robot guidance to enable automated pickup of the end section of the wire by the wire gripper.

20 Claims, 12 Drawing Sheets

(56)           References Cited

U.S. PATENT DOCUMENTS

2019/0381670 A1 *   12/2019   Correll .................... B25J 15/10
2021/0362330 A1 *   11/2021   Kolluri ................... B25J 9/163

* cited by examiner

GRIPPER CLOSES
AROUND WIRE

180

182

Take camera images

184

Crop images near gripper tip

186

HSV color filter

188

Erosion operation
to remove noise

190

Estimate distance, d, between
wire contact and gripper tip

IMAGE-BASED GUIDANCE FOR ROBOTIC WIRE PICKUP

RELATED PATENT APPLICATION

This application is a continuation of and claims priority from U.S. patent application Ser. No. 17/492,562 filed on Oct. 2, 2021, now U.S. Pat. No. 12,145,280, issued Nov. 19, 2024, which in turn claims the benefit of U.S. Provisional Application No. 63/142,112 filed on Jan. 27, 2021.

BACKGROUND

The present disclosure generally relates to the automated assembly of wire bundles of varying configurations on form boards. In particular, the present disclosure relates to automated pickup of wires.

Vehicles, such as large aircraft, have complex electrical and electromechanical systems distributed throughout the fuselage, hull, and other components of the vehicle. Such electrical and electromechanical systems require many bundles of wire, cables, connectors, and related fittings to connect the various electrical and electromechanical components of the vehicle. Often wires are grouped into assemblies known as wire bundle assemblies (also referred to herein as "wire harnesses"), which are typically assembled outside of the aircraft.

In accordance with a typical method for assembling wire bundles, form boards are used to stage a wire bundle into its installation configuration. Typically, each wire bundle of a given configuration fabricated in a wire shop requires a customized form board for lay-up. The form board typically includes a plurality of fixed form board devices which together define the given wire bundle configuration.

In one automated wire routing scenario, a wire is dispensed from a wire-routing end effector and routed through wire support devices distributed across a form board at specified positions dictated by the planned configuration of the wire bundle. However, the first end of each wire needs to be transferred to a secondary end effector (e.g., a contact-insertion end effector) that specializes in inserting the wire and its contact into a connector. A temporary wire-end holder is used to facilitate this transfer of the wire end section from the wire-routing end effector to the contact-insertion end effector.

As part of the foregoing automated wire bundle assembly process, the contact-equipped end of the wire has to be picked up from the form board device holding it prior to inserting the contact into a wire connector. Each wire has an electrically conductive wire contact crimped onto each end of each wire, which wire contact is then inserted into a specified hole of a wire connector, such as a hole formed in an elastomeric grommet. Because each wire of a wire bundle is unique and may carry a different type of signal, the contacts at the ends of the wires of a wire bundle assembly must be inserted into specific wire-contact insertion holes of the connector in order to make the proper connections.

One basic automated process for wire bundle assembly involves the following operations. A wire-routing end effector (coupled to a first robot arm) draws an individual wire or cable from a plastic containment spool called a "reelette". The first end of the wire protrudes out of a routing beak of the wire-routing end effector with a wire contact crimped thereon. The wire-routing end effector then places a portion of the wire into a temporary wire-end holder (hereinafter "wire holder") located on the form board near its final position, and next moves a short distance away to enable a contact-insertion end effector (coupled to a second robot arm) to access an adjacent portion of the wire. The contact-insertion end effector retrieves the held portion of the wire from the wire holder and then inserts the wire contact into a contact insertion hole formed in a nearby wire connector pre-mounted on the form board.

Thus, before inserting the contact in a wire connector, the wire must be picked up by the contact-insertion end effector. In particular, the capability is needed to pick up the wires from multiple different locations on the form board despite uncertainty about the exact position and orientation of each wire.

SUMMARY

The subject matter disclosed in some detail herein is directed to systems and processes (also referred to herein as "methods") for automated wire pickup using image-based robot guidance. For complex wire bundles, a wire-contact insertion tool needs to be mounted at the end of a robot arm to reach all locations on a form board. In particular, the capability is needed to pick up wires from multiple different locations on the form board. The machine vision-based system proposed herein includes means for visually estimating the position and orientation of a contact-equipped wire being held by a wire holder on a form board and then generating robot guidance to enable automated pickup of the end section of the wire by a contact-insertion end effector. The machine vision-based system provides visual feedback that enables successful execution of the robotic wire pickup process despite uncertainty about the exact location of the held portion of the wire.

In accordance with one embodiment, the machine vision-based system includes: a robot arm; a tool head coupled to the distal end of the robot arm and including a wire gripper motor; a wire gripper movably coupled to the tool head and operatively coupled to the wire gripper motor; a wire holder configured for clamping a wire; camera means mounted to the distal end of the robot arm and having first and second fields of view which intersect in a volume of space that includes the tip of the wire gripper and the wire holder; and a computer system configured to control operation of the robot arm motors and wire gripper motor. More specifically, the computer system is configured for visually estimating the position and orientation of a contact-equipped wire being held by the wire holder and then generating robot guidance to enable automated pickup of the end section of the wire by the wire gripper.

In the following disclosure, methods for automated wire pickup using image-based robot guidance will be described in the context of a system that is also capable of automated contact insertion into a wire connector subsequent to automated wire pickup. However, the methods disclosed herein may also be employed in conjunction with other types of automated processing of wire which require that an end section of wire being held by a wire holder be picked up to enable a subsequent automated operation.

As used in the following disclosure and in the appended claims, the phrase "to take a camera image" means to capture an individual, digital still frame of image data (a.k.a. an image data set) representing the image in the field of view of a camera at an instant in time. As used herein, the term "tip of wire gripper" includes the finger tip of a first gripper finger and the finger tip of a second gripper finger of the wire gripper. As used herein, the term "wire pickup" refers to picking up an end section of a wire, not picking up an entire wire. As used herein, the term "location", as applied to an object, includes position and orientation. As used herein, the term "camera means" includes a pair of cameras having intersecting fields of view, a single camera and mirrors arranged to provide intersecting fields of view, and structural equivalents thereof.

Although various embodiments of systems and methods for automated wire pickup using image-based robot guidance are described in some detail later herein, one or more of those embodiments may be characterized by one or more of the following aspects.

One aspect of the subject matter disclosed in detail below is a method for guiding a robot having a wire gripper and at least one camera, the method comprising: (a) holding a portion of a wire in a wire holder of a wire holding device, which wire has a wire contact disposed on one side of the wire holder; (b) taking camera images from different viewpoints while the portion of the wire is being held, which camera images include an image of a portion of a tip of the wire gripper; (c) deriving, from the camera images taken in step (b), visual feedback data representing an orientation of the wire gripper and a position of the tip of the wire gripper relative to a portion of the wire not held by the wire holder and disposed on an opposite side of the wire holder; (d) controlling the robot to align the wire gripper with the portion of the wire not held by the wire holder based on the visual feedback data derived in step (c); and (e) controlling the wire gripper to loosely grip while aligned with the portion of the wire not held by the wire holder.

In accordance with one embodiment of the method described in the immediately preceding paragraph, step (d) comprises: controlling the robot to change the orientation of the wire gripper to match the orientation of the portion of the wire not held by the wire holder based on the visual feedback data representing the orientation of the wire gripper; and thereafter controlling the robot to change the position of the wire gripper to align with the portion of the wire not held by the wire holder based on the visual feedback data representing the position of the wire gripper.

In accordance with the one embodiment of the above-described method, step (c) comprises calculating an estimated distance separating a center of the tip of the wire gripper and the portion of the wire not held by the wire holder based on the camera images taken; and step (d) comprises controlling the robot to move the wire gripper so that the distance separating the center of the tip of the wire gripper and the portion of the wire not held by the wire holder is less than a threshold.

The method may further comprise: (f) activating the wire holding device to release the portion of the wire that was previously held; (g) controlling the robot to raise the portion of the wire released in step (f) to a height above the wire holding device; (h) taking camera images from different viewpoints after the portion of the wire has been released and raised, which camera images include an image of the portion of the tip of the wire gripper and a portion of a nearest end of the wire contact; (i) calculating an estimated distance separating the tip of the wire gripper and the nearest end of the wire contact based on the camera images taken in step (h); (j) controlling the robot to slide the wire gripper toward the wire contact by the estimated distance calculated in step (i); and (k) controlling the wire gripper to tightly grip the wire subsequent to step (j). Thereafter, the robot may be controlled to insert the wire contact into a hole of a wire connector.

Another aspect of the subject matter disclosed in detail below is an automated system comprising: a robot arm comprising links and joints coupled to form a kinematic chain, and a plurality of robot arm motors for driving movement of a distal end of the robot arm; a tool head coupled to the distal end of the robot arm and comprising a wire gripper motor; a wire gripper movably coupled to the tool head and operatively coupled to the wire gripper motor, the wire gripper comprising a pair of gripper fingers which are configured for synchronized movements in mutually opposite directions for opening or closing the wire gripper, the gripper fingers having respective tips which form a tip of the wire gripper; a wire holder configured for clamping a wire; camera means mounted to the distal end of the robot arm and having first and second fields of view which intersect in a volume of space that includes the tip of the wire gripper and the wire holder; and a computer system configured to control operation of the robot arm motors and wire gripper motor. The computer system is configured to perform steps comprising: (a) activating the camera means to take camera images from different viewpoints while a portion of a wire is being held by the wire holder, which camera images include an image of a portion of a tip of the wire gripper; (b) deriving, from the camera images taken as a result of step (a), visual feedback data representing an orientation of the wire gripper and a position of the tip of the wire gripper relative to a portion of the wire not held by the wire holder; (c) controlling the robot arm motors to align the wire gripper with the portion of the wire not held by the wire holder based on the visual feedback data derived in step (b); and (d) controlling the wire gripper motor to cause the wire gripper to loosely grip while aligned with the portion of the wire not held by the wire holder.

A further aspect of the subject matter disclosed in detail below is a method for guiding a robot having a wire gripper and at least one camera, the method comprising: (a) taking camera images from different viewpoints while the wire gripper is stationary; (b) determining an orientation of a first portion of a wire relative to the wire gripper based on the camera images taken in step (a); (c) controlling the robot to rotate the wire gripper to be parallel to the first portion of the wire based on the orientation relative to the wire gripper determined in step (b); (d) taking camera images from different viewpoints while the wire gripper is parallel to the first portion of the wire; (e) calculating an estimated distance separating a center of a tip of the wire gripper and the first portion of the wire based on the camera images taken in step (d); (f) determining that the estimated distance calculated in step (e) is not less than a first threshold; (g) controlling the robot to move the wire gripper closer to the first portion of the wire by the estimated distance calculated in step (e); (h) taking camera images from different viewpoints after the wire gripper has been moved by the estimated distance calculated in step (e); (i) calculating an estimated distance separating the center of the tip of the wire gripper and the first portion of the wire based on the camera images taken in step (h); (j) determining that the estimated distance calculated in step (i) is less than the first threshold; (k) controlling a pair of gripper fingers of the wire gripper to move toward each other in response to step (j); (l) activating the wire holding device to release the second portion wire after the performance of step (k); (m) controlling the robot to raise the second portion of the wire to a height above the wire holding device after release; (n) taking camera images from different viewpoints while the second portion of the wire is at the height above the wire holding device; (o) calculating an estimated distance separating the center of a tip of the wire gripper and a nearest end of a wire contact attached to a third portion of the wire based on the camera images taken in step (n); (p) determining that the estimated distance calculated in step (o) is not less than a second threshold; (q) controlling the robot to move the wire gripper closer to the wire contact by the estimated distance calculated in step (p); (r) taking camera images from different viewpoints after the wire gripper has been moved by the estimated distance calculated in step (o); (s) calculating an estimated distance separating the center of a tip of the wire gripper and the nearest end of the wire contact based on the camera images taken in step (r); (t) determining that the estimated distance calculated in step (s) is less than the second threshold; and (u) controlling the wire gripper to grip the wire while the wire gripper is separated from the nearest end of the wire contact by the estimated distance calculated in step (s).

Yet another aspect of the subject matter disclosed in detail below is a method for guiding a robot having a wire gripper and at least one camera, the method comprising: (a) holding a first portion of a wire in a wire holder of a wire holding device; (b) taking camera images from respective viewpoints of a scene that includes a tip of the wire gripper in an open state in proximity to a second portion of the wire; (c) calculating a deviation of an orientation of the wire gripper from being parallel to the second portion of the wire based on the camera images taken in step (a); (d) controlling the robot to rotate the wire gripper so that the orientation of the wire gripper matches the orientation of the second portion of the wire; (e) taking camera images from respective viewpoints of a scene that includes the tip of the wire gripper in the open state while the orientation of the wire gripper matches the orientation of the second portion of the wire; (f) calculating a distance of the second portion of the wire from a center of the tip of the wire gripper based on the camera images taken in step (e); (g) determining that the distance calculated in step (f) is not less than a first threshold; (h) controlling the robot to move the wire gripper to reduce the distance separating a center of the tip of the wire gripper from the second portion of the wire; (i) taking camera images from respective viewpoints of a scene that includes the tip of the wire gripper in the open state while the distance separating the center of the tip of the wire gripper from the second portion of the wire is reduced; (j) calculating a distance of the second portion of the wire from a center of the tip of the wire gripper based on the camera images taken in step (i); (k) determining that the distance calculated in step (j) is less than the first threshold; and (l) controlling a pair of gripper fingers of the wire gripper to move to respective positions where the gripper fingers constrain displacement of the second portion of the wire in directions perpendicular to an axis of the wire in response to step (k). Steps (c), (d), (f)-(h), and (j)-(l) are performed by a computer system.

Other aspects of systems and methods for automated wire pickup using image-based robot guidance are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams briefly described in this section are drawn to scale.

Reference will hereinafter be made to the drawings in which similar elements in different drawings bear the same reference numerals.

DETAILED DESCRIPTION

Figure 1:
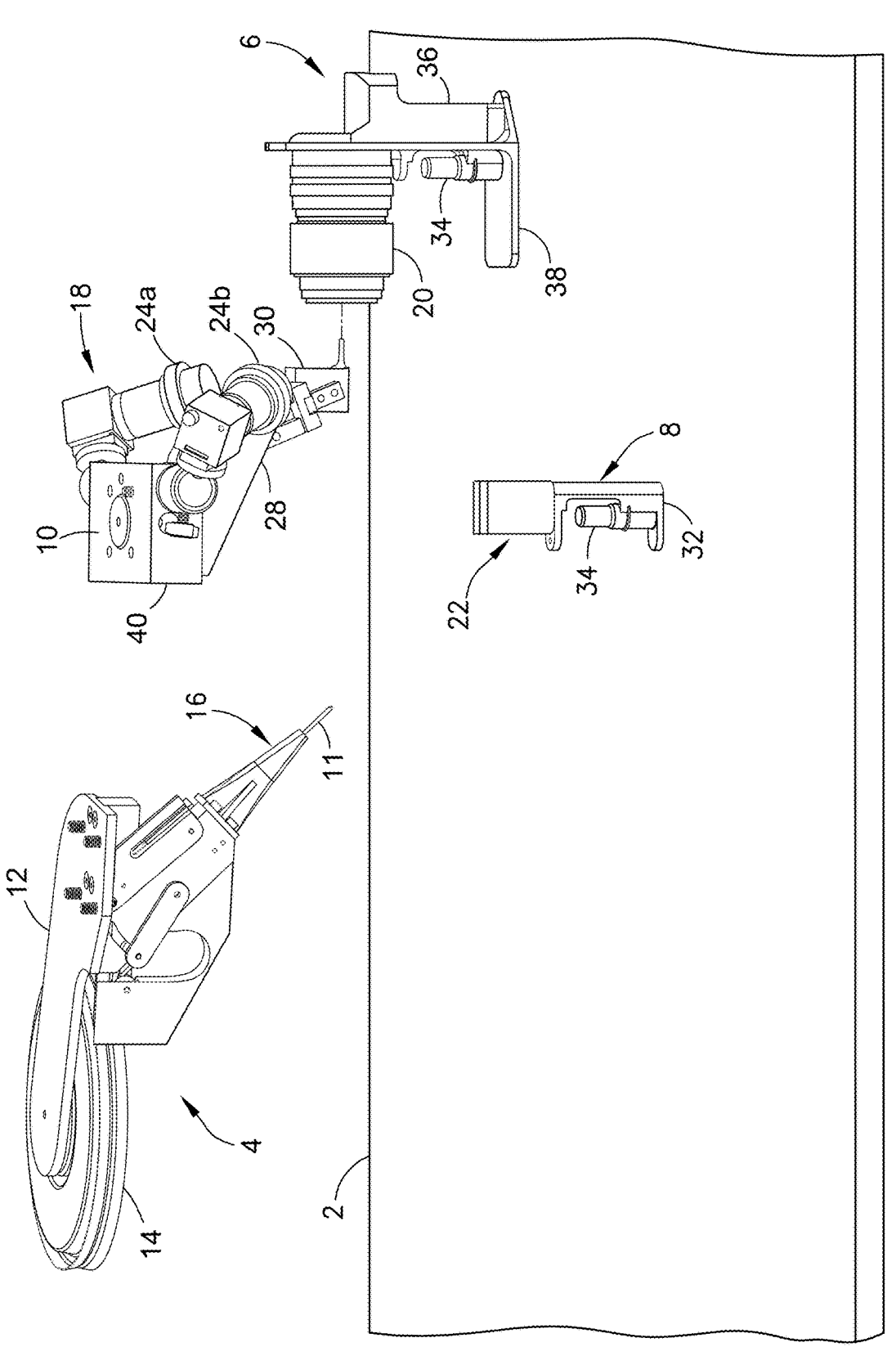
FIG. 1 is a diagram representing a three-dimensional view of a wire holding device and a wire connector support device attached to a form board, a wire-routing end effector configured to place a portion of a wire in the wire holding device, and a contact-insertion end effector configured to remove the wire from the wire holding device and insert a wire contact into a hole in a wire connector supported by the wire connector support device.

For the purpose of illustration, systems and processes for automated wire pickup using image-based robot guidance will now be described in detail. However, not all features of an actual implementation are described in this specification. A person skilled in the art will appreciate that in the development of any such embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

In the aerospace industry, wires are typically assembled into wire bundles on a harness form board. Some harnesses may have hundreds or thousands of wires. A typical wire bundle assembly process includes the following steps: (1) Individual wires are marked and cut with extra length. (2)

The first end of each wire is prepared (strip off insulation, crimp wire contact). (3) "First-end" connectors are placed on a form board. (4) Each wire is robotically placed and routed onto the form board in a repeatable sequence, including (a) inserting the first end of the wire into a first-end connector; (b) routing the wire to its second-end destination on the form board; and (c) inserting the second end of the wire into a second-end connector. In one proposed implementation, step 4b is performed by a wire-routing end effector and steps 4a and 4c are performed by a contact-insertion end effector. In this example, the end of a wire having an electrically conductive wire contact to be inserted in a connector is transferred from the wire-routing end effector to the contact-insertion end effector by a process in which the wire-routing end effector first places a portion of the wire end section in a wire holding device and then the contact-insertion end effector removes the held portion from the wire holding device. The contact-insertion end effector then inserts the wire contact into a hole in the wire connector.

An automated wire routing process may be performed by a robotic system that includes multiple articulated robots. Each articulated robot may be implemented using, for example, without limitation, a jointed robot arm. Depending on the implementation, each articulated robot may be configured to provide movement and positioning of at least one tool center point corresponding to that robot with multiple degrees of freedom. As one illustrative example, each articulated robot may take the form of a robot arm capable of providing movement with up to six degrees of freedom or more.

In one illustrative example, the articulated robots of the robotic system may take a number of different forms, such as a wire-routing robot and a wire contact-insertion robot. Each articulated robot has a tool coordinate system. The tool coordinate system consists of two components: a tool frame of reference (also referred to herein as "the frame of reference of the tool head") and a tool center point (TCP). The tool frame of reference includes three mutually perpendicular coordinate axes; the TCP is the origin of that frame of reference. When the robot is instructed to move at a certain speed, it is the speed of the TCP that is controlled. The tool coordinate system is programmable and can be "taught" to the robot controller for the particular end effector attached to the robot arm. In the case of the wire-routing end effector, each path of the TCP may be offset from the previous path during the assembly of a particular wire bundle. One way to achieve this is to program the robot controller with a respective set of motion instructions for each wire path. In the alternative, one motion instruction may be executed in a repetitive loop with incremental offsets being introduced after each pass.

FIG. 1 is a diagram representing a three-dimensional view of a wire holding device 8 and a wire connector support device 6 attached to a form board 2. To avoid clutter in the drawing, the perforations in form board 2 are not shown in FIG. 1 (but see FIG. 2). The system further includes a wire-routing end effector 4 and a contact-insertion end effector 18, which may be mounted to the ends of respective robotic (manipulator) arms (not shown in FIG. 1). The end section of wire 11 (protruding from wire-routing end effector 4 in FIG. 1) is transferred the wire holding device 8 to temporarily hold the wire 11 after drop-off by the wire-routing end effector 4 and before pickup by the contact-insertion end effector 18. More specifically, the wire holding device 8 includes a wire holder 22 which is configured to hold the end section of wire 11 while the majority of the wire 11 remains stored in a reelette 14 of the wire-routing end effector 4. In accordance with one embodiment, the wire holding device 8 is pneumatically controlled (meaning that the wire holder 22 can be opened or closed by operation of a pneumatic actuator).

In one exemplary implementation, the wire holding device 8 includes a C-frame 32 and a temporary fastener 34 which is coupled to a lower arm of the C-frame 32 and to a perforation in form board 2. In addition, the wire holding device 8 includes a wire holder 22 which is actuatable to open and close (e.g., a wire holder which is opened and closed pneumatically). The wire holder 22 is mounted to the upper arm of C-frame 32.

The contact-insertion end effector 18 further includes a first camera 24a and a second camera 24b coupled to opposite sides of the mounting plate 10 for the purpose of providing visual feedback to the robot motion controller. The cameras 24a and 24b may be activated concurrently to capture images of portions of wire 11, wire gripper 30, and wire connector 20 in spatial relationship. For example, cameras 24a and 24b enable automated visual alignment of the wire gripper 30 with the wire 11 prior to wire pickup.

After the wire-routing end effector 4 places the end section of wire 11 in the wire holder 22, the remainder of wire 11 in reelette 14 is routed through a multiplicity of form board devices (not shown in FIG. 1) using the wire-routing end effector 4. In the example depicted in FIG. 1, the wire-routing end effector 4 includes a mounting plate 12 (attached, e.g., to the end of a robot arm not shown in FIG. 1) and a reelette 14 rotatably coupled to the mounting plate 12. Prior to the start of a wire routing operation, the majority of wire 11 is contained within reelette 14. The wire-routing end effector 4 further includes a routing beak 16 having a channel through which wire 11 is dispensed.

After the wire 11 has been routed through the form board devices, the wire-routing end effector 4 is moved away from the form board 2. During the wire routing operation or after its completion, the contact-insertion end effector 18 approaches the wire holder 22 and uses visual feedback from cameras 24a and 24b to align with and then pick up the contact-equipped end section of wire 11. More specifically, the contact-insertion end effector 18 is configured to remove the held portion of the wire 11 from the wire holding device 8 after the latter has been opened. The contact-insertion end effector 18 then carries the contact-equipped end section of wire 11 toward the wire connector support device 6.

The wire connector support device 6 includes an L-frame 36 and a temporary fastener 34 which is coupled to a base plate 38 of the L-frame 36 and to a perforation in form board 2. The wire connector 20 includes a wire contact-receiving grommet (not shown in FIG. 1) having a multiplicity of spaced cavities (holes). The wire contact-receiving grommet is typically made of dielectric material. The contact-insertion end effector 18 is controlled to insert the contact into a hole formed in the grommet of wire connector 20. For a particular wire bundle configuration, the respective wire contacts of wires to be terminated at wire connector 20 are inserted in succession into respective cavities.

In the example depicted in FIG. 1, the contact-insertion end effector 18 includes a mounting plate 10 which is attached to the end of a robot arm (not shown in FIG. 1). The contact-insertion end effector 18 further includes: (a) a force/torque sensor 40, which is fastened to the mounting plate 10; (b) a tool head 28, which is fastened to the force/torque sensor 40; and (c) a wire gripper 30, which is movably coupled to the tool head 28. The wire gripper 30 is driven to open or close by a wire gripper motor (not shown in FIG. 1, but see wire gripper motor 58 in FIG. 12), which is part of the tool head 28. In particular, the wire gripper 30 may include a pair of mutually opposing fingers which are configured to grip a portion of the wire 11 while another portion of the wire 11 is held by the wire holder 22. (It should be appreciated that FIG. 1 shows the wire 11 prior to being placed in the wire holder 22 by the wire-routing end effector 4, which placement in turn occurs prior to contact insertion.)

Figure 2:
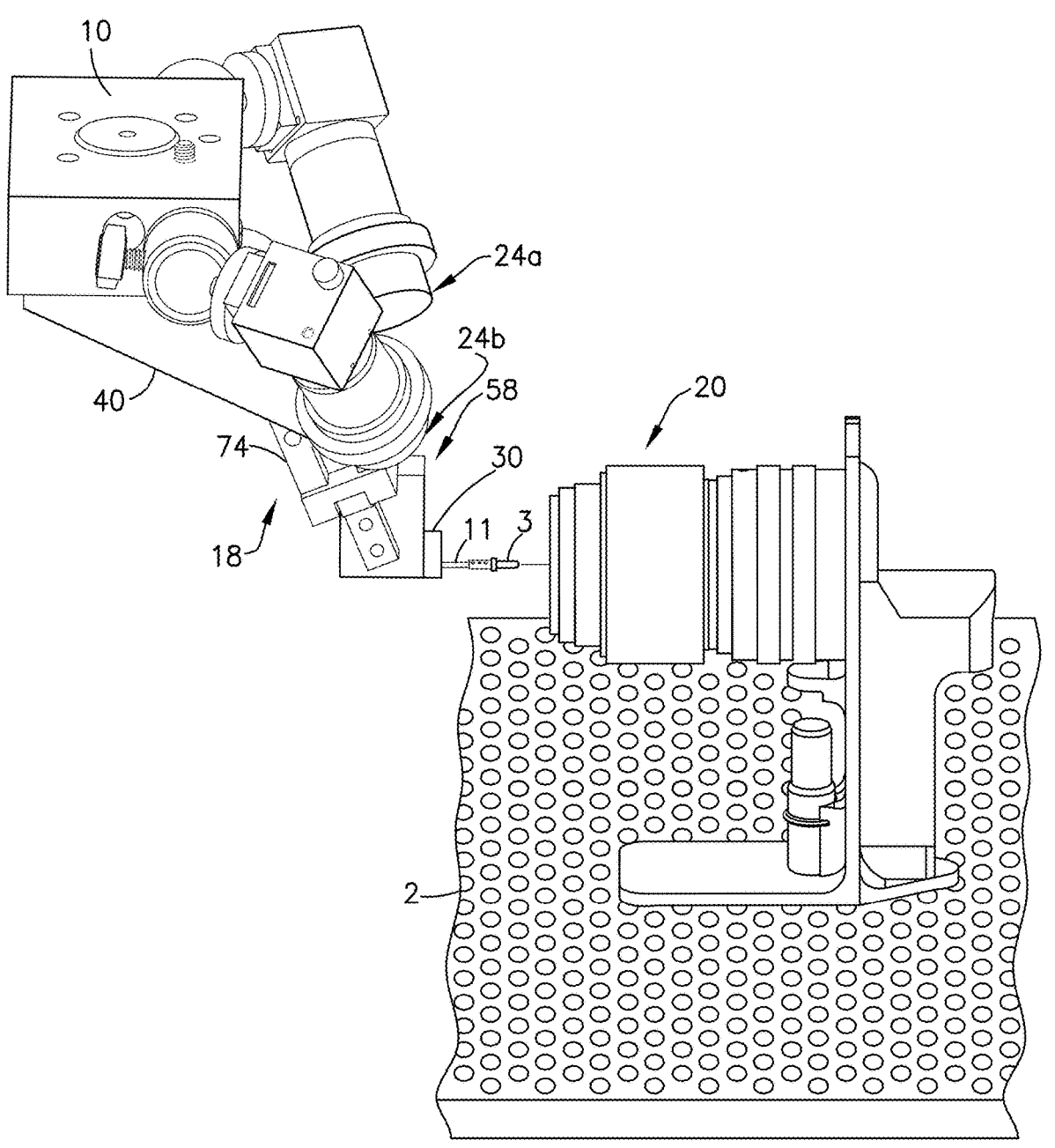
FIG. 2 is a diagram representing a snapshot of one implementation of a contact-insertion end effector at an instant in time during insertion of a contact into a wire connector.

FIG. 2 is a diagram representing a snapshot of one implementation of a contact-insertion end effector 18 of the type depicted in FIG. 1. FIG. 2 shows the contact-insertion end effector 18 carrying a wire 11 in the wire gripper 30. A wire contact 3 has been crimped to one end of the wire 11 and is shown positioned for insertion into the wire connector 20. The wire gripper 30 is designed to clamp wire 11 when wire gripper 30 is closed.

The contact-insertion end effector 18 depicted in FIG. 2 includes a mounting plate 10 which is attached to the distal end of a robotic arm (not shown in FIG. 2). The robotic arm may have six degrees of freedom of movement (three translational and three rotational). The tool head 28 of contact-insertion end effector 18 is coupled to the mounting plate 10 by way of the force/torque sensor 40. The force/torque sensor 40 is mainly used in the contact insertion process, but is also used during wire pickup to abort the process if there is a collision or the wire 11 is stuck in the wire holder 22. In accordance with one proposed implementation, the force/torque sensor 40 is mounted between the mounting plate 10 and a bracket 74 that connects to the wire gripper motor 58.

As seen in FIG. 2, cameras 24a and 24b are coupled to opposing sides of mounting plate 10 by means of mechanisms which allow the respective orientations of cameras 24a and 24b to be adjusted relative to mounting plate 10 and then secured to provide intersecting fixed fields of view. The fields of view intersect in a volume of space that includes a tip of wire gripper 30, wire contact 3, and the apertured face of wire connector 20. The cameras 24a and 24b enable automated visual alignment of the gripped wire contact 3 with a hole in the wire connector 20 prior to contact insertion.

Figure 3:
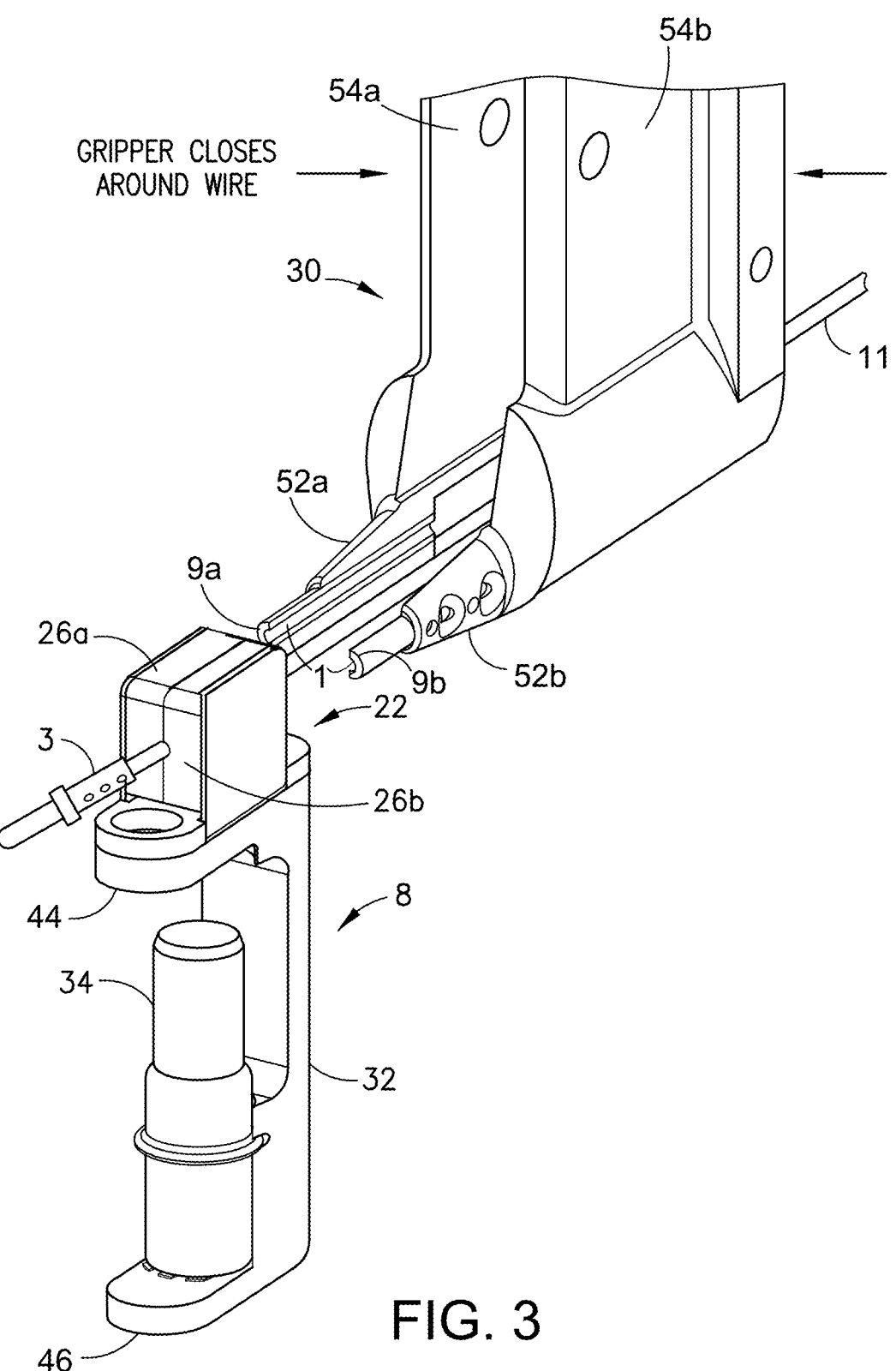
FIG. 3 is a diagram representing a three-dimensional view of an open wire gripper with a pair of gripper fingers aligned with and on opposite sides of one portion of a wire having another portion held by a wire holder.

FIG. 3 is a diagram representing a three-dimensional view of an open wire gripper 30 with a pair of gripper fingers 52a and 52b aligned with and on opposite sides of one portion of a wire 11 having another portion held by a wire holding device 8. In the scenario depicted in FIG. 3, a first portion of wire 11 has a wire contact 3 crimped thereon; a second portion of wire 11 is held between a pair of gripping pads 26a and 26b of wire holder 22; and a third portion of wire 11 is aligned with and disposed between gripper fingers 52a and 52b. The wire holder 22 is fastened to an upper arm 44 of C-frame 32. A lower arm 46 of C-frame 32 is fastened to a form board (not shown in FIG. 3). The gripping pads 26a and 26b are made of resilient material (such as rubber or polyurethane). In accordance with one proposed implementation, the gripping pads 26a and 26b contact each other when the wire holder 22 is fully closed.

In accordance with the embodiment depicted in FIG. 3, the wire gripper 30 comprises gripper fingers 52a and 52b respectively supported by gripper arms 54a and 54b. As previously mentioned, execution of the wire pickup operation depends on controlling the position of the TCP of the contact-insertion end effector 18. In the example depicted in FIG. 3, the TCP is the midpoint (center point) between the tips 9a and 9b of gripper fingers 52a and 52b of wire gripper 30, also referred to herein as the "center of the wire gripper".

The gripper arms 54a and 54b are movably coupled for synchronized (concurrent) movements in opposite directions, which movements respectively cause the gripper fingers 52a and 52b, which project forward from the gripper arms 54a and 54b respectively, to open or close. The gripper fingers 52a and 52b may be integrally formed with or attached to gripper arms 54a and 54b. The gripper fingers 52a and 52b are movable incrementally from an open position toward a closed position. The incremental movements are driven by the wire gripper motor 38, which may be an electronically controlled stepper motor. The gripper fingers 52a and 52b are configured with mutually opposing grooves 1 configured to surround and constrain an intervening portion of wire 11 when wire gripper 30 is closed by activation of wire gripper motor 58. When the wire gripper motor 58 is closing the wire gripper 30, motor feedback indicates when it has clamped down onto the wire 11 (not yet fully closed). The wire gripper motor 58 may then take one or more steps in the open direction to limit how long the wire 11 is being "crushed", so as to avoid permanent wire damage.

Optionally, the lowermost portions of gripper arms 54a and 54b adjacent to gripper fingers 52a and 52b may be provided with means (not shown in the drawings) for applying a gripping force on a fourth portion of the wire 11 adjacent to the third portion which is being cradled between the gripper fingers 52a and 52b when the wire gripper 30 is closed. For example, the means for applying a gripping force may include opposing sets of interlocking teeth which press against alternating contact points on opposite sides of the wire 11 when the wire gripper 30 is closed. The teeth increase the friction between wire 11 and wire gripper 30 to enable inserting the contact 3 into the wire connector 20. In addition, the teeth enable performance of a pull test after insertion.

The gripper arms 54a and 54b are mechanically linked so that they move in opposite directions in tandem: moving toward each other to close and away from each other to open. For example, the gripper arms 54a and 54b may be mechanically coupled by respective nuts to a lead screw having a right-handed thread that drives translation of first gripper arm 54a in one direction and having a left-handed thread that drives translation of second gripper arm 54b in the opposite direction.

Figure 4:
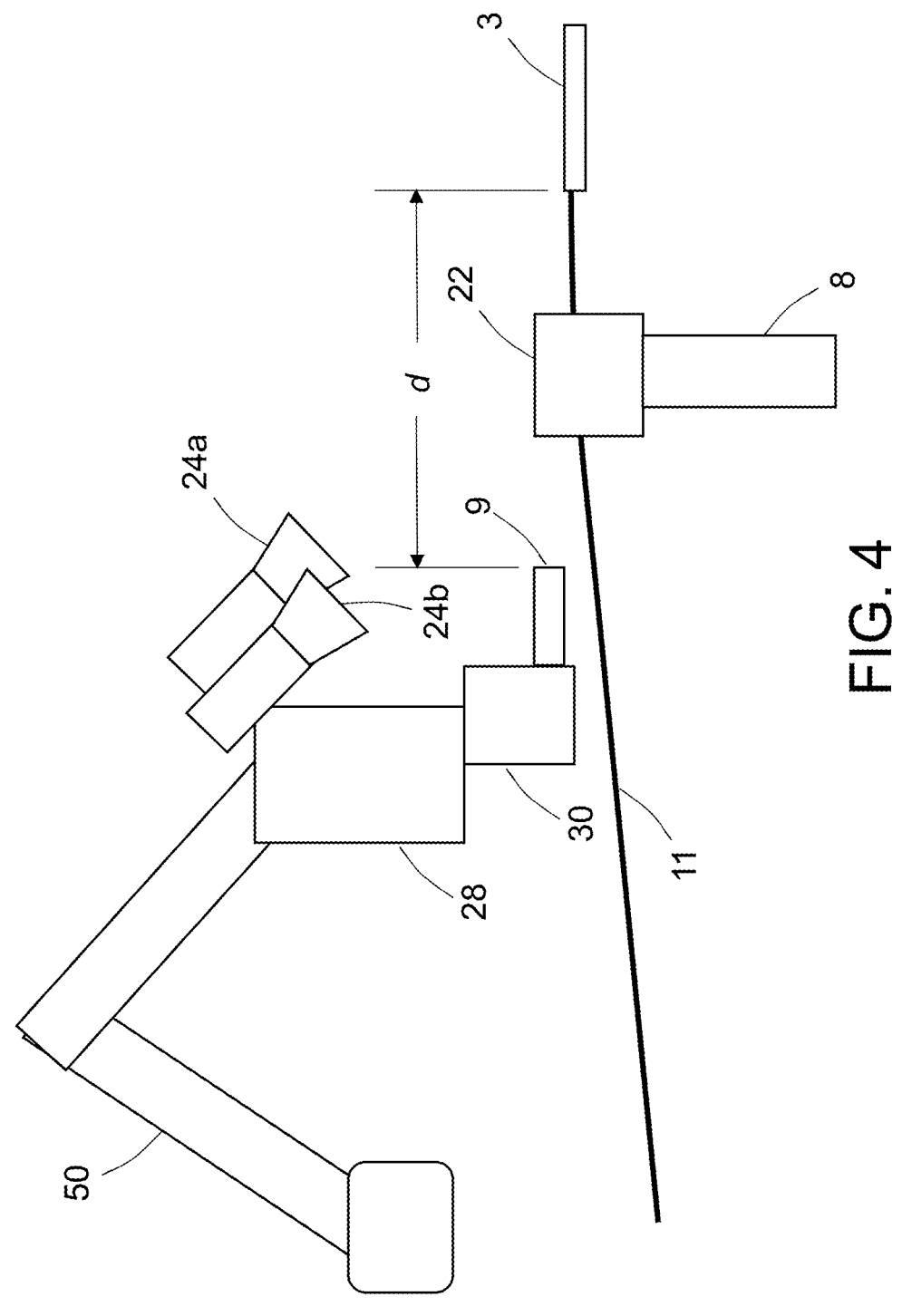
FIG. 4 is a diagram representing a side view of a wire gripper supported by a robot arm in a position in proximity to a portion of a contact-equipped wire held by a wire holder.

FIG. 4 is a diagram representing a side view of a robotic system for picking up a wire in accordance with one embodiment. In the scenario depicted in FIG. 4, a wire 11 (having a wire contact 3 on one end) has been parked at (is being held by) a wire holder 22 and is accessible for pickup. The robotic system includes a robot arm 50 and contact-insertion end effector 18 coupled to the end of robot arm 50 (by way of a mounting plate not shown). The robot arm 50 has at least six degrees of freedom so that the location (position and orientation) of wire gripper 30 can be adapted to any wire position and orientation. The embodiment depicted in FIG. 4 further includes two cameras 24a and 24b, which are coupled to the mounting plate. The cameras 24a and 24b are oriented so that the intersection of their respective fields of view includes the tip 9 of wire gripper 30 (or more precisely, the tips of two gripper fingers of the wire gripper), the wire holder 22, and the wire contact 3. The tip 9 of the wire gripper 30 is separated from the nearest end of the wire contact 3 by a distance d.

While the embodiments depicted in FIGS. 1, 2, and 4 include two cameras 24a and 24b, other embodiments may include more than two cameras. Further, a single camera may be used in conjunction with mirrors to provide different viewpoints of the components within respective intersecting fields of view. Capturing images having multiple viewpoints, such as using two or more cameras, enables accurate positioning of the tip 9 of wire gripper 30 relative to wire 11 and then relative to wire contact 3.

Initially, the gripper tip is moved to a predefined position near the wire holder 22. In accordance with one proposed algorithm, the predefined position is 5 mm to 15 mm above the wire 11 and 3 mm to 2 cm behind the wire holder 22 on the opposite side of the wire contact 3. In this position, cameras 24a and 24b take respective images. A computing device (not shown in FIG. 4, but see computing device 64 in FIG. 11) is programmed to process the captured images and then generate machine commands to move the tool head 28 in dependence on the image processing results.

Figure 5:
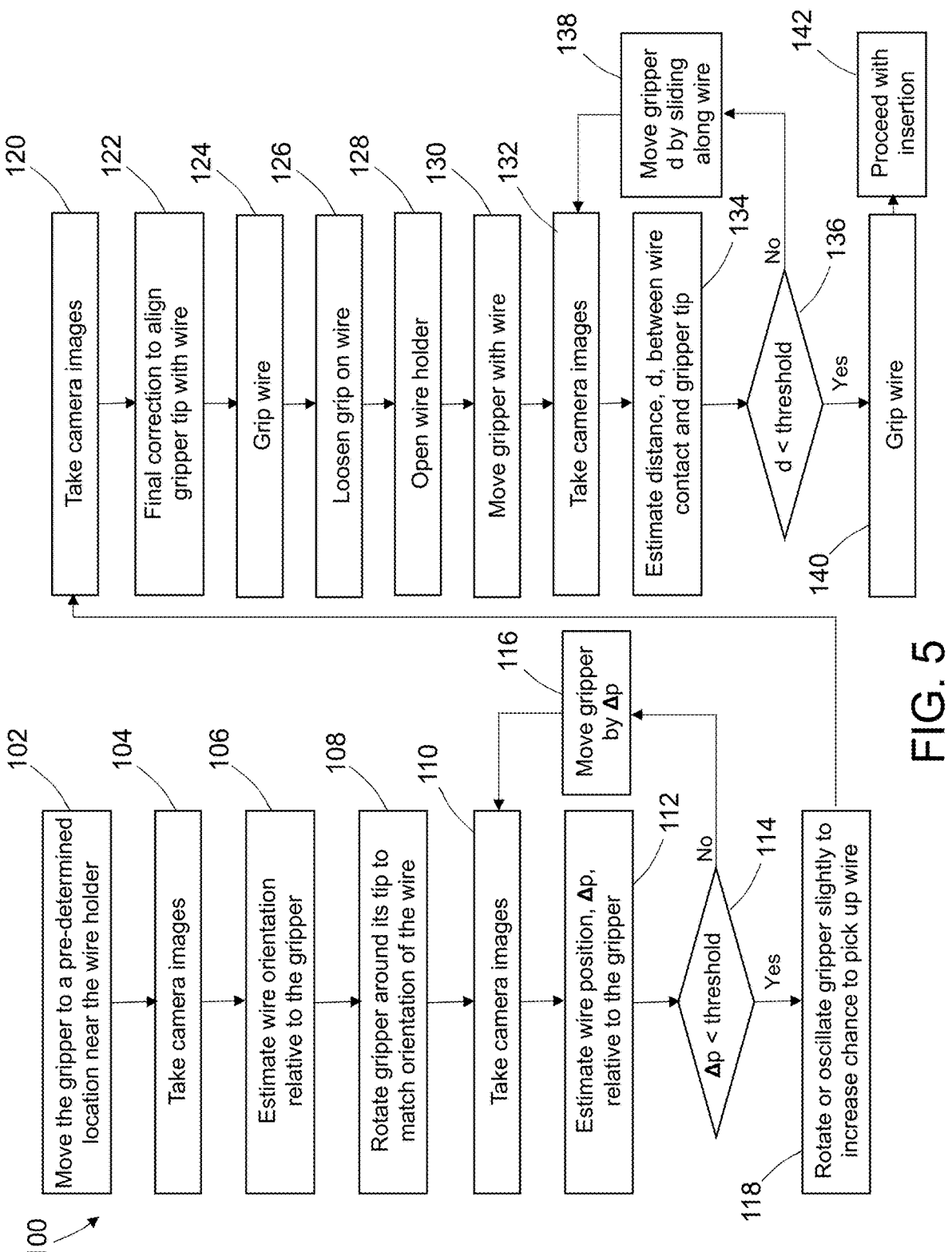
FIG. 5 is a flowchart identifying steps of a process for picking up the end section of a wire and removing the held portion from a wire holder prior to wire-contact insertion.

FIG. 5 is a flowchart identifying steps of a process 100 for robotically aligning the wire gripper 30 with the end section of a wire 11 that is being held by a wire holder 22, removing the end section from the wire holder 22, and then inserting the wire contact 3 into an assigned hole in a wire connector 20. For insertion, the robot arm 50 moves the wire contact 3 in front of the apertured face of wire connector 20 and proceeds with insertion. For example, the contact may be inserted using a machine-vision system to automatically align wire contacts with wire contact insertion holes of a wire connector and then insert the wire contacts into respective holes of the wire connector as disclosed in U.S. patent application Ser. No. 16/536,598 filed on Aug. 9, 2019.

After a wire 11 has been placed in a wire holding device 8 as shown in FIG. 4, the wire gripper 30 is moved to a predetermined location near the wire holder 22 (see FIG. 5, step 102). After the wire gripper 30 has arrived at the predetermined position, respective images are taken using cameras 24a and 24b (step 104). The images show the tip of the wire gripper 30 and a portion of wire 11 extending outside the wire holder 22. The images are processed to estimate the deviation of the orientation of wire gripper 30 from being parallel with wire 11 (step 106). Given the estimated deviation in orientation, robot movement commands are executed to rotate the wire gripper 30 until its orientation matches the orientation of wire 11 (step 108). The orientations match if the axes of the wire gripper 30 and wire 11 are parallel or at a sufficiently small angle that wire 11 may enter the space between gripper fingers 52a and 52b when open wire gripper 30 is lowered.

Figure 6:
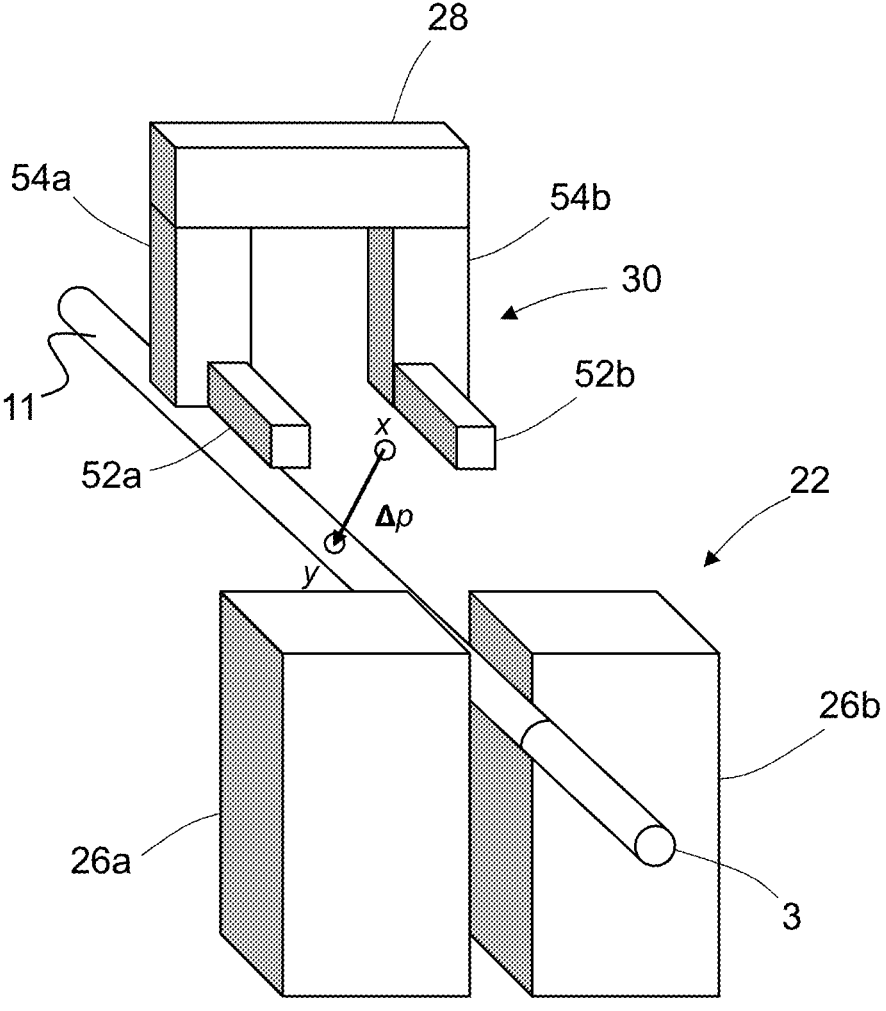
FIG. 6 is a diagram representing a three-dimensional view of an open wire gripper with a pair of gripper fingers aligned with and disposed higher than a portion of a wire that is being held by a wire holder.

After the wire gripper 30 has been rotated, again respective images are taken using cameras 24a and 24b (step 110). These images are processed to estimate the distance Δp separating wire 11 from the center of wire gripper 30 (step 112) or, more specifically, the midpoint between the tips 9 of gripper fingers 52a and 52b (as seen in FIG. 6). Given the estimated distance Δp, robot movement commands are executed to move the wire gripper 30 such that wire 11 is positioned between gripper fingers 52a and 52b (seen in FIG. 3). These commands are executed in a control loop: images are taken (step 110); the distance Δp is estimated (step 112), and then a determination is made whether Δp is less than a first threshold or not (step 114).

On the one hand, if a determination is made in step 114 that Δp is not less than the first threshold (e.g., 1 mm), then a wire gripper movement command is executed that moves wire gripper 30 toward wire 11 by a distance equal to Δp (step 116). Then steps 110, 112, and 114 are repeated.

On the other hand, if a determination is made in step 114 that Δp is less than the first threshold, then the wire gripper 30 is aligned with the wire 11, meaning that the wire is both parallel with the axis of the open wire gripper 30 and between the gripper fingers 52a and 52b. After the gripper tip is aligned with the wire 11, the backside of the open wire gripper 30 (opposite to the tip) is rotated downward and then left and right to increase the probability that the wire 11 is caught between the gripper teeth (step 118). As a non-limiting example, the backside of the wire gripper 30 is equipped with teeth to hold the wire 11. Here, the wire gripper 30 is rotated around the tip 9 of wire gripper 30 to keep the wire 11 centered between the gripper fingers 52a and 52b.

Upon completion of the foregoing rotations, respective images are taken using cameras 24a and 24b (step 120). Based on the visual feedback, a final corrective movement is executed to center the wire 11 in between the tips of the gripper finger 52a and 52b (step 122). As a next step, the wire gripper 30 closes to grip the wire 11 (step 124). Then the wire gripper 30 is opened slightly to allow sliding the wire gripper 30 along the wire 11 (step 126). After slightly opening the wire gripper 30, a command is sent to open the wire holder 22 (step 128), thereby releasing the wire 11 from the wire holder 22. Then the wire gripper 30 rotates or moves such that the resulting sliding motion along the wire 11 avoids colliding with the wire holder 22 (step 130).

The goal of the sliding motion is for the wire gripper 30 to grasp the portion of wire 11 which is adjacent to the wire contact 3 for subsequent contact insertion. During the sliding motion, in a closed-loop control, camera images are taken of the wire inside the gripper (step 132), and the distance d between the tip 9 of wire gripper 30 and the nearest end of wire contact 3 is estimated (step 134). Then a determination is made whether d is less than a second threshold or not (step 136).

On the one hand, if a determination is made in step 136 that d is not less than the second threshold (e.g., 1.6 mm), then a wire gripper movement command is executed that moves wire gripper 30 toward wire contact 3 (by sliding along wire 11) by a distance equal to d (step 1138). Then steps 132, 134, and 136 are repeated. If the wire contact 3 is out of sight from the cameras or too far away to estimate distance d reliably, then the forward sliding motion is capped at a maximum distance. A non-limiting example of this maximum is 20 mm.

On the other hand, if a determination is made in step 136 that d is less than the second threshold, then the sliding motion stops and the wire gripper 30 closes to firmly grasp the portion of wire 11 adjacent to wire contact 3 (step 140). After grasping the wire 11, the robot 62 (identified in FIG. 11) moves the wire contact 3 to a location in front of the apertured face of the wire connector 20 and then proceeds with automatic contact insertion into an assigned hole in the wire connector 20 (step 142).

FIG. 6 is a diagram representing a three-dimensional view of an open wire gripper 30 with a pair of gripper fingers 52a and 52b not yet aligned with a portion of a wire 11 that is being held (clamped) between a pair of gripper pads 26a and 26b of a closed wire holder 22. The distance Δp is indicated by a straight line that extends from a point y along a center axis of wire 11 from a midpoint x between the tips of gripper fingers 52a and 52b. As previously described with respect to FIG. 5, the control computer is configured (e.g., programmed) to cease the alignment procedure when distance Δp becomes less than the first threshold. (In the alternative, the alignment procedure may be terminated when Δp equals the first threshold.)

The processes for estimating the orientation and position of a wire 11 relative to the tip 9 of a wire gripper 30 will be described in more detail with reference to FIGS. 7-9. Thereafter, the process for estimating the distance d between the tip 9 of wire gripper 30 and the nearest end of wire contact 3 will be described in more detail with reference to FIG. 10.

Figure 7:
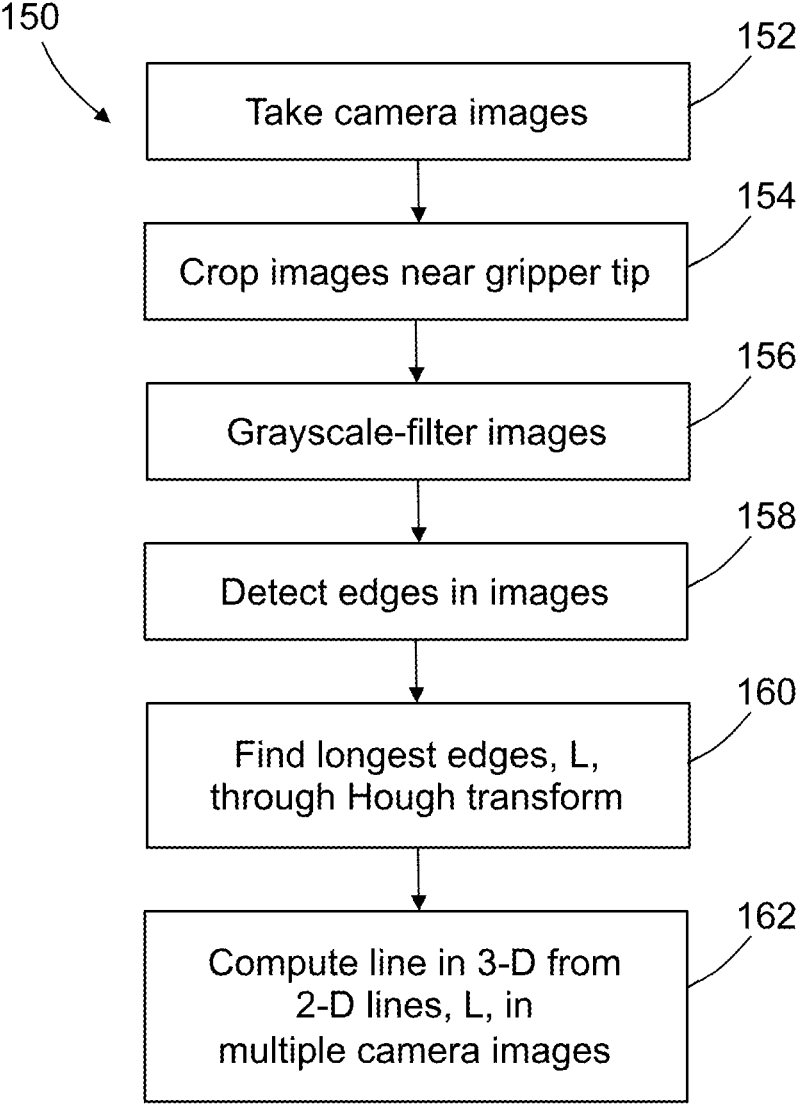
FIG. 7 is a flowchart identifying steps of a process for estimating the orientation of an end section of a wire prior to wire pickup.

FIG. 7 is a flowchart identifying steps of a process 150 for estimating the orientation of an end section of wire 11 prior to wire pickup. The orientation is estimated with respect to the frame of reference of the tool head 28 using two or more camera images. In a preparatory step (not shown in FIG. 7), e.g., as part of a calibration routine, the location of the wire gripper tip is estimated inside all camera images. This estimate can be either manual, e.g., by clicking with a mouse pointer on the location of the wire gripper tip inside an image or automatic. An example of such an automatic process is to fit a line to the gripper fingers (which process will be described in more detail below with reference to FIG. 9) and estimate the endpoint of the fitted line.

The process 150 begins by taking camera images while the tip 9 of wire gripper 30 is stationary and in proximity to the proximate portion of wire 11 that is adjacent to but not clamped by the wire holder 22 (step 152). Therefore, the proximate wire portion is visible (within the fields of view of) the pair of cameras 24a and 24b.

Next, the camera images are cropped at predetermined locations to create respective sets of image data that include image data representing the tip 9 of wire gripper 30 seen from the different viewpoints of cameras 24a and 24b (step 154). In accordance with one non-limiting example, the size of the cropped region may include 300×150 pixels within a 1200×1600 pixel image. The size of the cropped region may be chosen such that a segment of the wire is clearly visible within this region, and there are only a few visual distractions in the background. (FIG. 9 shows an example of such a cropped region.)

As a next step, the cropped images are grayscale-filtered by averaging across all color channels (step 156). Then, edges are detected in the resulting images (step 158). An example algorithm for edge detection is the Canny edge detection method disclosed by J. Canny in "A Computational Approach to Edge Detection," IEEE Transactions on Pattern Analysis and Machine Intelligence, Vol. 8, No. 6 (1986), pp. 679-698, the use of which algorithm is widespread in the field of automated recognition of patterns and regularities in data.

To find the wire 11 inside an image, a Hough transform is carried out on the image of the detected edge L (step 160). The Hough transform is a feature extraction technique used in image analysis, computer vision, and digital image processing. The purpose of the technique is to find imperfect instances of objects within a certain class of shapes by a voting procedure. This voting procedure is carried out in a parameter space, from which object candidates are obtained as local maxima in a so-called accumulator space that is explicitly constructed by the algorithm for computing the Hough transform. The classical Hough transform was concerned with the identification of lines in the image, but later the Hough transform was extended to identify positions of arbitrary shapes, most commonly circles or ellipses. The Hough transform was disclosed in U.S. Pat. No. 3,069,654 as a means for machine recognition of complex lines in photographs or other pictorial representations. In particular, U.S. Pat. No. 3,069,654 disclosed a method for recognizing particle tracks in pictures obtained from a bubble chamber by detecting straight lines. A linear Hough transform algorithm uses a two-dimensional (2-D) array, called an accumulator, to detect the existence of a line.

The Hough transform algorithm extracts lines from each camera image. From all detected lines, the dominant one is chosen (i.e., the longest line). Then, the average line is computed across the dominant line and its neighboring lines that are in the same direction and have a length above a threshold (e.g., 0.5 of the maximum value from the Hough transform). The resulting line is an estimate of the 2-D direction of the wire 11 within a camera image.

Finally, the 2-D directions from at least two camera images are used to compute the three-dimensional (3-D) vector representing the wire orientation (step 162). To compute the 3-D vector, the cameras 24a and 24b have to be calibrated, i.e., the intrinsic and extrinsic camera parameters have to be known or estimated before contact insertion (see U.S. patent application Ser. No. 16/536,598, which includes an example for camera calibration). To estimate the 3-D vector, two points are chosen on each 2-D line extracted from the respective camera images. Then virtual rays are formed from the respective camera location through these points in the image plane. For each line, two rays span a plane in 3-D space. The intersection of two planes (from two cameras) in 3-D space is a line and represents the estimated 3-D direction (orientation) of the wire 11 at the tip 9 of wire gripper 30 in the Cartesian space (frame of reference) of the tool head 28.

Figure 8:
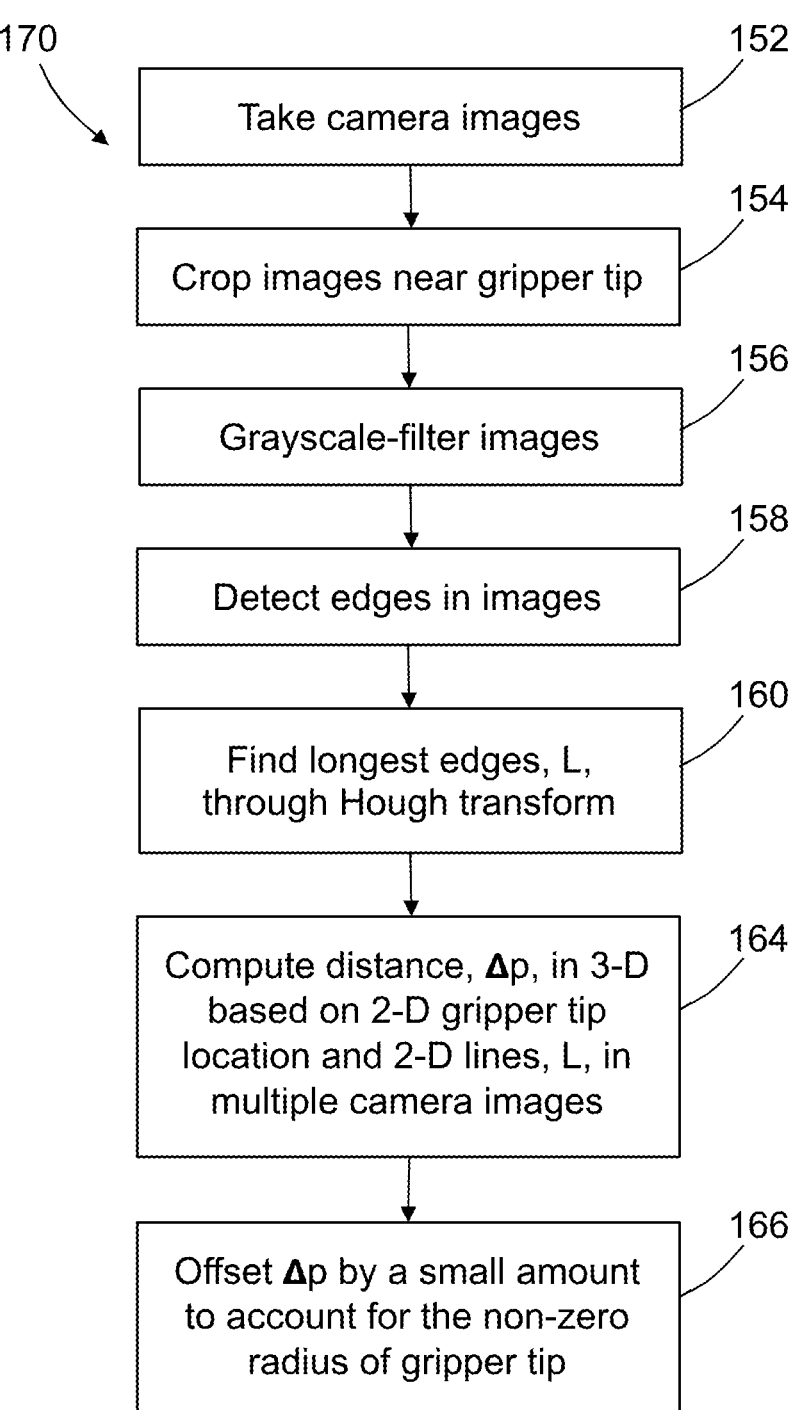
FIG. 8 is a flowchart identifying steps of a process for estimating the position of a wire relative to a center of a tip of a wire gripper prior to wire pickup.

FIG. 8 is a flowchart identifying steps of a process 170 for estimating the position of the section of wire 11 to be gripped prior to wire pickup. The position is estimated with respect to the frame of reference of the tool head 28, again using two or more camera images. Steps 152, 154, 156, 158, and 160 of process 170 are the same operations previously described with reference to FIG. 7 and can be shared between the two processes. Process 170 differs from process 150 in the manner in which the longest edges (found in step 160) are further processed. First, the coordinates of the 3-D location x of the wire gripper tip are computed by finding the optimal location that projects closest onto the tip locations inside the camera images (step 164). These projections require the intrinsic and extrinsic camera parameters, as obtained by a calibration routine, as described above. Second, the coordinates of the optimal 3-D position y in the plane perpendicular to the gripper fingers and anchored at x are computed such that it projects closest onto the longest edges in the images. So y is a point on the wire 11. The relative position of the wire 11 is then computed as $\Delta p = y - x$. Since the visible location of the gripper tip is on the top side of the gripper fingers and not at the center of their cross section, $\Delta p$ has to be corrected by an offset (step 166), e.g., $\Delta p' = \Delta p + 0.001$ mm. The offset accounts for the non-zero radius of the tip 9 when the wire gripper 30 is closed. Here, y is constrained to a plane through the wire gripper tip because it is desired that the corrective movement $\Delta p'$ also be constrained to the same plane.

Figure 9:
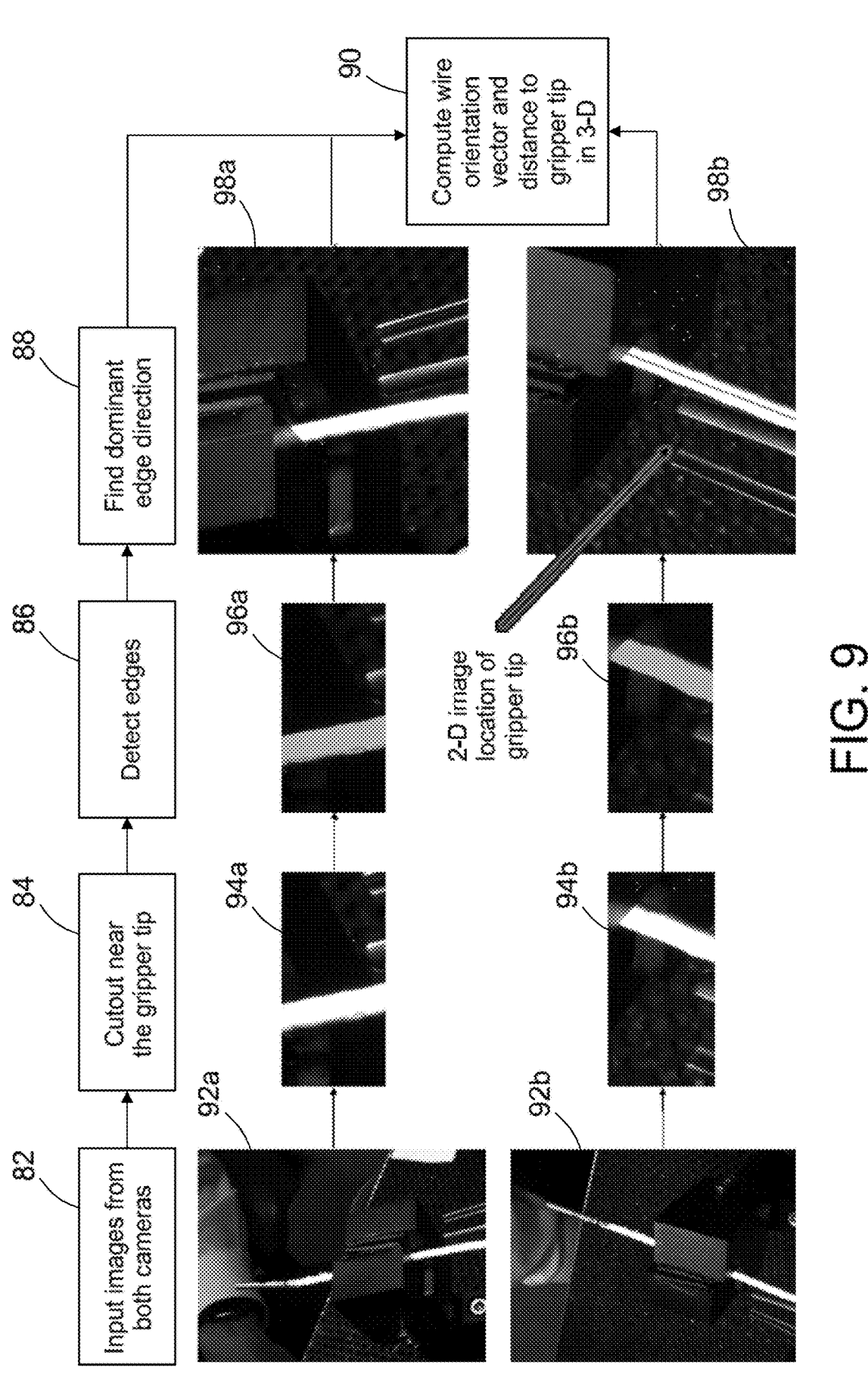
FIG. 9 is a diagram showing image processing steps for estimating the orientation and position of an end section of a wire prior to wire pickup.

FIG. 9 is a diagram showing image processing steps for estimating the orientation and position of an end section of a wire 11 prior to wire pickup in accordance with one embodiment in which the two processes 150 and 170 share common steps up to and including estimating the direction of the dominant edge of the portion of the wire end section which is in front of the wire holder 22 and visible to the cameras 24a and 24b. The contact at the end of the wire, the wire holder, and the portions of the end section of the wire visible on opposite sides of the wire holder are all visible in the images 92a and 92b. The two images 92a and 92b from the cameras 24a and 24b are input into a computer or processor configured (programmed) with machine vision software capable of estimating the orientation and position of the end section of wire 11 (step 82). The images 92a and 92b are cropped to form respective cutouts near the tip 9 of wire gripper 30 (step 84). Example cropped images 94a and 94b—respectively extracted from images 92a and 92b and including respective tips of a pair of gripper fingers—are shown in FIG. 9. Then, the edges of the wire in the cropped images 94a and 94b are detected (step 86). The detected edges are indicated by the superposition of red (or other suitable color) lines on the edges, resulting in images 96a and 96b. The computer or processor than finds the dominant edge direction (orientation) using the Hough transform (step 88). The detected edges are indicated by the superposition of a red line indicating the dominant edge in each of images 98a and 98b. Thereafter, the computer or processor computes the wire orientation vector and the distance separating the wire gripper tip (the midpoint between the tips of the gripper fingers) and the wire (steps 90).

Figure 10:
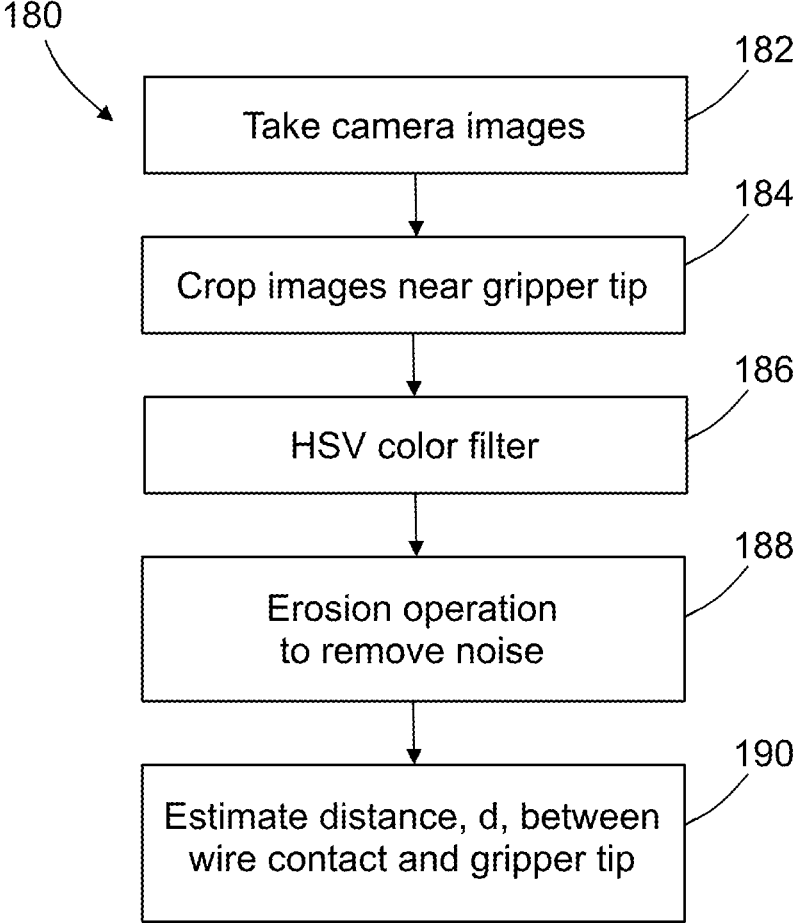
FIG. 10 is a flowchart identifying steps of a process for estimating the distance between the nearest end of a wire contact and a center of a tip of a wire gripper.

FIG. 10 is a flowchart identifying steps of a process 180 for estimating the distance d (shown in FIG. 4) between the nearest end of a wire contact 3 and a center of a tip 9 of a wire gripper 30. First, respective images are taken (captured) by the cameras 24a and 24b (step 182).

Second, in each camera image, a small region is cut out above and expanding in the direction of the wire gripper tip (step 184). The size of this region may, for example, be 300×400 pixels at a camera resolution of 1200×1600 pixels.

Third, in each cutout region, pixels with the color of the wire contact are extracted using a hue-saturation-value (HSV) color filter (step 186). Alternatively, some other representation of the RGB color model could be employed. Pixels of the chosen color can be extracted by first converting the cutout images into HSV color space and, then, applying thresholds on the HSV values, e.g., $16 \leq H \leq 30$, $60 \leq S \leq 180$, and $80 \leq V \leq 255$, where the maximum ranges for H, S, and V are 0 to 180, 0 to 255, and 0 to 255, respectively.

Fourth, to remove noise, an erosion operation is carried out on the extracted pixels (step 188). The erosion operation consists of convoluting an image A with some kernel B, which can have any shape or size, but is usually a square or circle. The kernel B has a defined anchor point. Typically, the anchor point is the center of the kernel. As the kernel B is scanned over the image, the image processor computes a local minimum pixel value over the area of the kernel and replaces the pixel under the anchor point with that minimum value. The result of the erosion operation is that the bright areas of the image become thinner, whereas the dark zones become thicker. In accordance with one proposed implementation, the parameter for the erosion operation uses a kernel of size 4×4 pixels. Let E be the set of remaining pixels after this erosion operation.

Finally, to estimate the distance d between gripper tip and wire contact, the closest pixel c in E to the gripper tip is found in each camera image. The 3-D coordinates of the closest pixels and the gripper tip are computed in an optimization process that finds the locations that project closest to c and the gripper tip respectively in at least two images. These projections require the intrinsic and extrinsic camera parameters, as noted above. The estimated distance d is computed as the Euclidean distance between the optimized 3-D coordinates.

Figure 11:
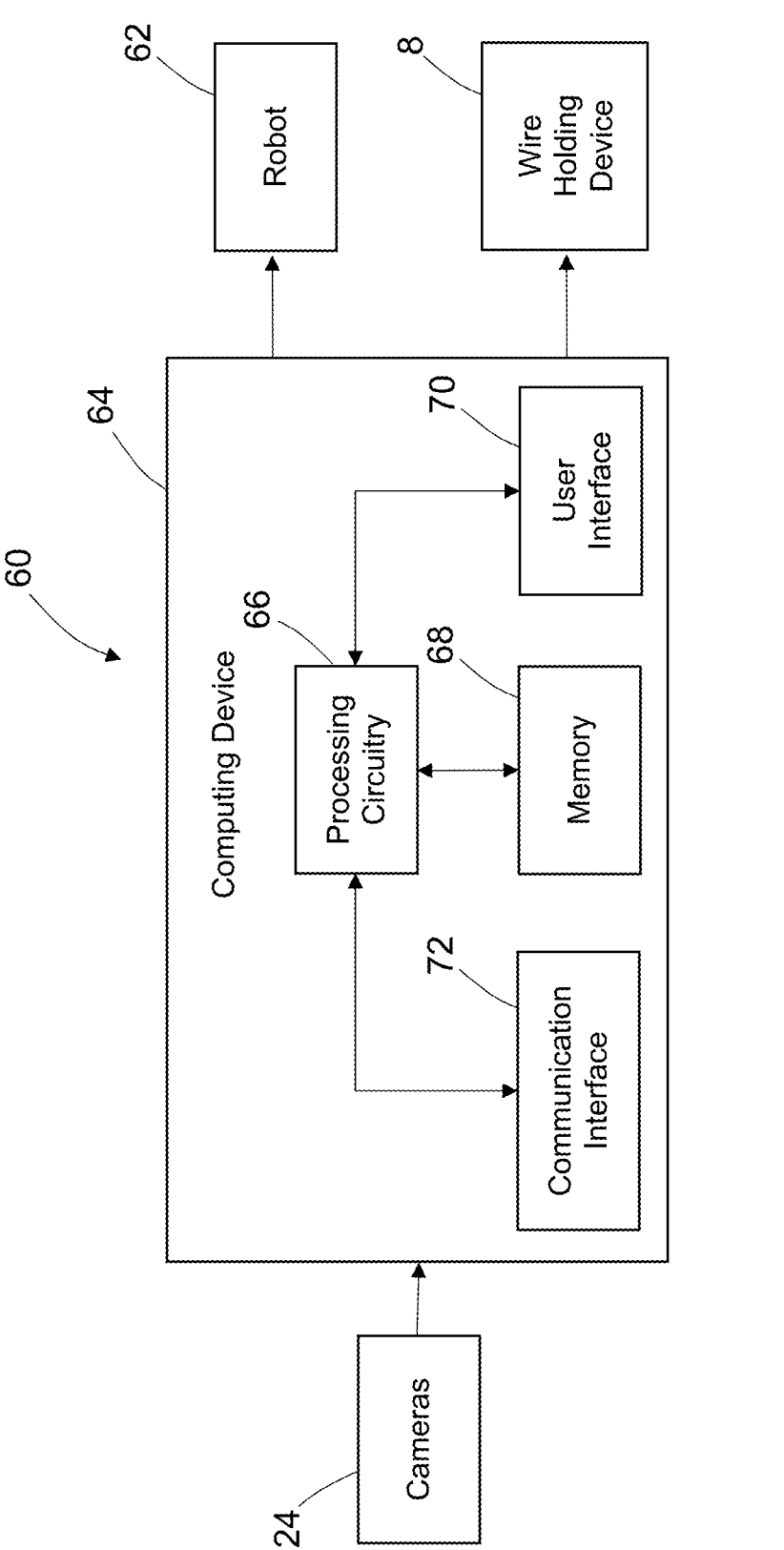
FIG. 11 is a block diagram identifying some components of a system configured to automatically pick up a wire based on computer vision feedback in accordance with one embodiment.

FIG. 11 is a block diagram identifying some components of a system 60 configured to automatically pick up a wire based on computer vision feedback in accordance with one embodiment. The system 60 includes a robot 62, a computing device 64, cameras 24, and a wire holding device 8. The computing system 64 includes an image processing module that processes image data received from cameras 24 to derive computer vision feedback and a robot motion command module that sends robot motion commands to the robot 62 based on the computer vision feedback. The robot 62 may include a body and the robot arm 50 depicted in FIG. 4. The robot arm 50 is a sequence of link and joint combinations. The robot 62 further includes the contact-insertion end effector 18 (including tool head 28) depicted in FIG. 1, which is mounted to the distal end of the robot arm 50.

The robot motion command module of the computing device 64 is configured (e.g., programmed) to provide commands that enable the robot 62 to perform the following movements: (1) align the wire gripper 30 with an end section of a wire 11 being held by wire holding device 8; (2) move the wire gripper 30 closer to the wire contact 3; (3) pick up the end section of wire 11; and (4) insert the wire contact 3 into a specified hole in a wire connector 20 (see FIG. 2). The computing device 64 is also configured to command the wire holding device 8 to open prior to moving the wire gripper 30 closer to the wire contact 3.

The cameras 24 are configured to capture images of the volume of space surrounding the tip 9 of the wire gripper 30. While plural cameras are indicated in FIG. 11, embodiments may employ mirrors to provide various viewpoints of the wire gripper 30 using a single camera. A variety of other types of image capture devices may be used in place of cameras. Image capture devices, generally, capture an image of the field of view of the device. For example, a camera may be used which captures an image of the field of view in the visible light spectrum and processes the image accordingly. The cameras 24 may be configured to capture a gray-scale image of wire gripper 30 and a wire 11. Alternatively, the cameras 24 may be configured to capture color images of wire gripper 30 and a wire 11. In an embodiment in which color images are captured, the image associated with each different color channel of the cameras 24, such as the red, green, and blue color channels, may be averaged to create a composite image for subsequent analysis and review. Alternatively, the different color channels of the cameras 24 may be separately analyzed. The orientations of cameras 24 are selected, adjusted, and then fixed prior to the start of a wire pickup operation. In one proposed implementation, the cameras 24 are oriented so that the intersection of their respective fields of view includes wire contact 3, the wire holding device 8, and the tip 9 of wire gripper 30.

The computing device 64 may be configured in various manners and, as such, may be embodied as a personal computer, a tablet computer, a computer workstation, a mobile computing device such as a smartphone, a server or the like. Regardless of the manner in which the computing device 64 is embodied, the computing device of an example embodiment includes or is otherwise associated with processing circuitry 66, memory 68, and optionally a user interface 70 and a communication interface 72 for performing the various functions described herein. The processing circuitry 66 may, for example, be embodied as various means including one or more microprocessors, one or more co-processors, one or more multi-core processors, one or more controllers, one or more computers, various other processing elements including integrated circuits such as, for example, an ASIC (application specific integrated circuit) or FPGA (field programmable gate array), or some combination thereof. In some example embodiments, the processing circuitry 66 is configured to execute instructions stored in the memory 68 or otherwise accessible to the processing circuitry. These instructions, when executed by the processing circuitry 66, may cause the computing device 64 and, in turn, the system 60 to perform one or more of the functionalities described herein. As such, the computing device 64 may comprise an entity capable of performing operations according to an example embodiment of the present disclosure while configured accordingly. Thus, for example, when the processing circuitry 66 is embodied as an ASIC, FPGA or the like, the processing circuitry and, correspondingly, the computing device 64 may comprise specifically configured hardware for conducting one or more operations described herein. Alternatively, as another example, when the processing circuitry 66 is embodied as an executor of instructions, such as may be stored in the memory 68, the instructions may specifically configure the processing circuitry and, in turn, the computing device 64 to perform one or more algorithms and operations described herein.

The memory 68 may include, for example, volatile and/or non-volatile memory. The memory 68 may comprise, for example, a hard disk, random access memory, cache memory, flash memory, an optical disc (e.g., a compact disc read only memory (CD-ROM), digital versatile disc read only memory (DVD-ROM), or the like), circuitry configured to store information, or some combination thereof. In this regard, the memory 68 may comprise any non-transitory tangible computer-readable storage medium. The memory 68 may be configured to store information, data, applications, instructions, or the like for enabling the computing device 64 to carry out various functions in accordance with example embodiments of the present disclosure. For example, the memory 68 may be configured to store program instructions for execution by the processing circuitry 66.

The user interface 70 may be in communication with the processing circuitry 66 and the memory 68 to receive user input and/or to provide an audible, visual, mechanical, or other output to a user. As such, the user interface 70 may include, for example, a display for providing an image captured by a camera 24 and/or an image visually depicting the closest match between the candidate wire contacts and a predetermined template. Other examples of the user interface 70 include a keyboard, a mouse, a joystick, a microphone and/or other input/output mechanisms.

The communication interface 72 may be in communication with the processing circuitry 66 and the memory 68 and may be configured to receive and/or transmit data, such as by receiving images from the cameras 24 and transmitting information, such as a list of candidate wire-contact insertion holes, wire contact ID numbers and locations of the candidate wire-contact insertion holes in a connector-based coordinate system, to robot 62. The communication interface 72 may include, for example, one or more antennas and supporting hardware and/or software for enabling communications with a wireless communication network. Additionally or alternatively, the communication interface 72 may include the circuitry for interacting with the antenna(s) to cause transmission of signals via the antenna(s) or to handle receipt of signals received via the antenna(s). In some environments, the communication interface 72 may alternatively or also support wired communication.

Figure 12:
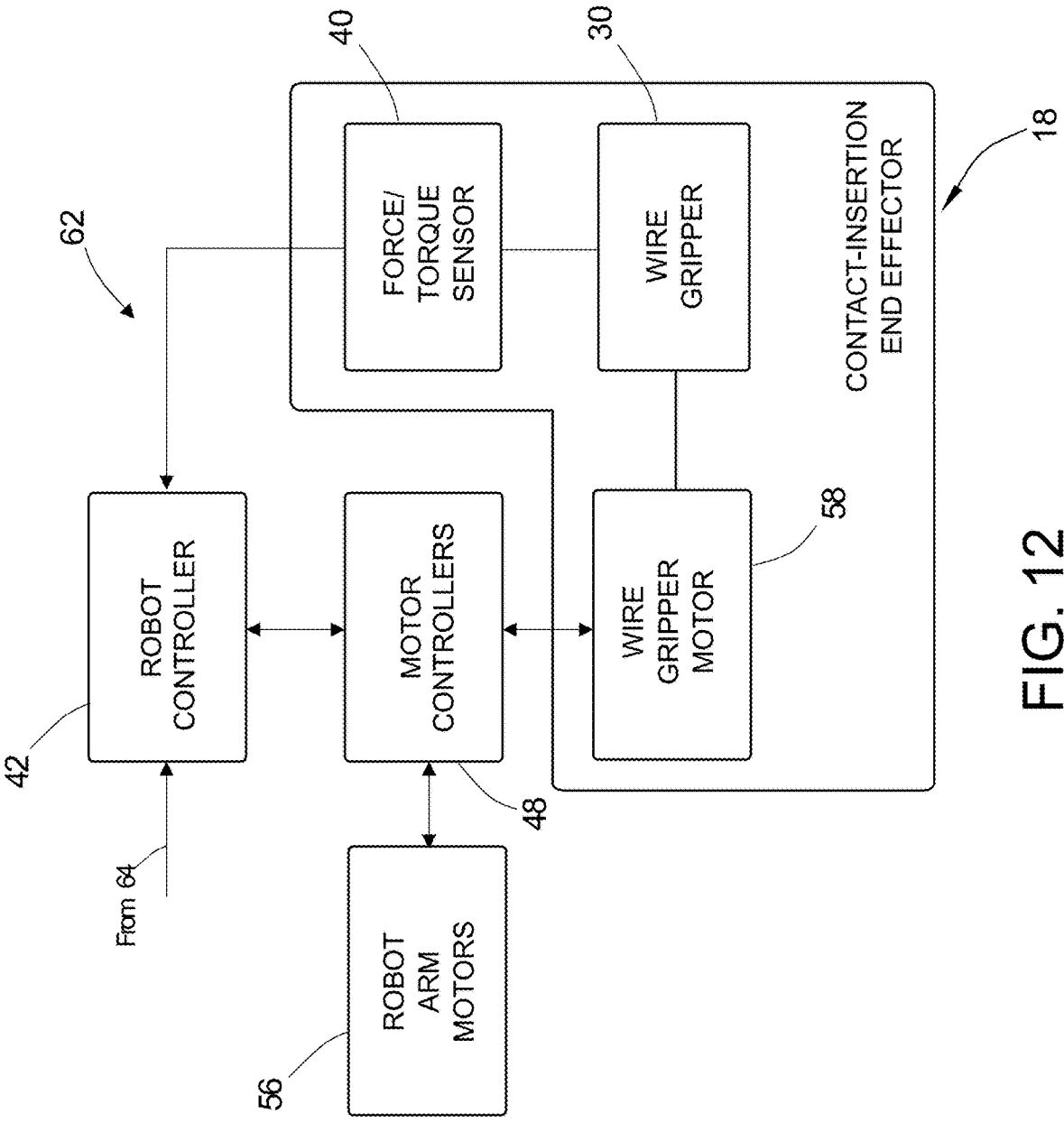
FIG. 12 is a block diagram identifying some components of a robot configured to pick up a wire for automated contact insertion into a wire connector in accordance with one proposed implementation.

FIG. 12 is a block diagram identifying some components of a robot 62 configured to pick up a wire and then insert the wire contact into a wire connector in accordance with one proposed implementation. The robot 62 depicted in FIG. 12 includes a robot arm (not included in FIG. 12), a robot controller 42, a plurality of motor controllers 48, a plurality of robot arm motors 56, and a contact-insertion end effector 18. For example, the robot arm may be articulated and each joint connecting links of the robot arm may have a respective robot arm motor 56 associated with that link for causing rotation of one link relative to another link. In addition, the robot arm may have a telescoping arm which is extended or retracted by an associated robot arm motor. In particular, the robot controller 42 is configured to control operation of robot arm motors 56 for controlling the movements of wire gripper 30 previously described with reference to the flowchart of FIG. 5 (see, e.g., steps 116 and 138). More specifically, robot controller 42 controls the motion path of the tip 9 of the wire gripper 30. Each robot controller is a respective computer or processor configured with executable computer code stored in a non-transitory tangible computer-readable storage medium.

In addition, the robot 62 includes a motor controller 48 that controls the operation of a wire gripper motor 58. The wire gripper motor 58 and the associated wire gripper 30 are parts of the contact-insertion end effector 18 (and, more specifically, part of the tool head 28 shown in FIGS. 1, 2, and 4), which is mounted to the distal end of the robot arm. The wire gripper 30 is driven to open or close by the wire gripper motor 58 via an associated gear train (not shown in drawings) for driving movement (e.g., synchronized translation in opposite directions) of gripper arms 54a and 54b (shown in FIG. 3).

In accordance with one embodiment, the contact-insertion end effector 18 also includes a force/torque sensor 40. The force/torque sensor 40 is used during wire pickup to abort the process if there is a collision or the wire 11 is stuck in the wire holder 22. The condition for abortion is simple: a computer continuously monitors the force at the tip 9 of the wire gripper 30 and if the force is above a threshold (e.g., 3 Newtons during pickup), the pickup operation is aborted. The force/torque sensor 40 measures the force at the mounting plate 10, but the force of interest is the force exerted at the tip of wire gripper 30, so the robot controller 42 is configured to compute a geometric transformation of the measured force so that the resulting value corresponds to the force at the gripper tip.

The contact-insertion end effector 18 is coupled to the distal end of the robot arm of robot 62. The body of robot 62 may be either a mobile pedestal or a gantry which carries the robot arm. The robot controller 42 is configured to control movement of the mobile pedestal or gantry relative to ground, movement of the robot arm relative to the mobile pedestal or gantry, and rotation of the contact-insertion end effector 18 relative to the distal end of the robot arm. An example of a robot that could be employed with the wire-routing end effector is robot Model KR-150 manufactured by Kuka Roboter GmbH (Augsburg, Germany), although any other robot or manipulator capable of controlling the location of the wire gripper 30 in the manner disclosed herein may be employed.

In summary, when viewed in conjunction, FIGS. 4, 11, and 12 show an automated system 60 for automated wire pickup using image-based robot guidance in accordance with one embodiment. The automated system 60 includes a robot arm 50 comprising links and joints coupled to form a kinematic chain and a plurality of robot arm motors 56 for driving movement of a distal end of the robot arm. The automated system 60 further includes a tool head 28 coupled to the distal end of the robot arm 50. The tool head 28 comprises a wire gripper motor 58. In addition, the automated system 60 includes a wire gripper 30 movably coupled to the tool head 28 and operatively coupled to the wire gripper motor 58. The wire gripper 30 comprises a pair of gripper fingers 52a and 52b which are configured for synchronized movements in mutually opposite directions for opening or closing the wire gripper 30. The gripper fingers 52a and 52b have respective tips 9a and 9b (see FIG. 3)

which form the tip 9 of the wire gripper 30. The automated system 60 also includes a wire holder 22 configured for clamping a wire 11. In addition, automated system 60 includes cameras 24*a* and 24*b* mounted to the distal end of the robot arm 50. The cameras 24*a* and 24*b* have first and second fields of view which intersect in a volume of space that includes the tip 9 of wire gripper 30 and the wire holder 22. Lastly, the automated system 60 includes a computer system (e.g., computing device 64, robot controller 42, and motor controllers 48) which is configured to control operation of the robot arm motors 56 and wire gripper motor 58.

More specifically, the computer system is configured to perform steps comprising: (a) activating the cameras 24*a* and 24*b* to take camera images from different viewpoints while a portion of a wire 11 is being held by the wire holder 22, which camera images include an image of a portion of a tip 9 of the wire gripper 30; (b) deriving, from the camera images taken as a result of step (a), visual feedback data representing an orientation of the wire gripper 30 and a position of the tip 9 of the wire gripper 30 relative to a portion of the wire 11 not held by the wire holder 22; (c) controlling the robot arm motors 56 to align the wire gripper 30 with the portion of the wire 11 not held by the wire holder 22 based on the visual feedback data derived in step (b); and (d) controlling the wire gripper motor 58 to cause the wire gripper 30 to loosely grip while aligned with the portion of the wire 11 not held by the wire holder 22. The camera images may be taken at the same time or in succession.

In addition, the computer system may be configured to perform steps comprising: (e) activating the wire holder 22 to release the portion of the wire 11 that was previously held; (f) controlling the robot arm motors 56 to raise the portion of the wire 11 released in step (e) to a height above the wire holder 22; (g) activating the cameras 24*a* and 24*b* to take camera images from different viewpoints after the portion of the wire 11 has been released and raised, which camera images include an image of the portion of the tip 9 of the wire gripper 30 and a portion of a nearest end of a wire contact 3; (h) calculating an estimated distance separating the tip 9 of the wire gripper 30 and the nearest end of the wire contact 3 based on the camera images taken in step (g); (i) controlling the robot arm motors 56 to slide the wire gripper 30 toward the wire contact 3 by the estimated distance calculated in step (h); and (j) controlling the wire gripper 30 to tightly grip the wire 11 subsequent to step (i).

Certain systems, apparatus, applications or processes have been described herein as including a number of modules. A module may be a unit of distinct functionality that may be implemented in software, hardware, or combinations thereof, except for those modules which are preferably implemented as hardware or firmware to enable streaming calculations as disclosed herein. When the functionality of a module is performed in any part through software, the module can include a non-transitory tangible computer-readable storage medium.

While systems and methods for automated wire pickup using image-based robot guidance have been described with reference to various embodiments, it will be understood by those skilled in the art that various changes may be made and equivalents may be substituted for elements thereof without departing from the scope of the teachings herein. In addition, many modifications may be made to adapt the teachings herein to a particular situation without departing from the scope thereof. Therefore it is intended that the claims not be limited to the particular embodiments disclosed herein.

As used herein, the term "robot controller" means a computer or processor configured or programmed to control the robotic movements described in detail herein. As used herein, the term "image processor" means a computer or processor configured or programmed to process image data to compute the position and/or orientation of components appearing in at least two camera images taken with different viewpoints. As used herein, the term "computer system" should be construed broadly to encompass a system having at least one computer or processor, and which may have multiple computers or processors that communicate through a network or bus. For example, a computer system may include an image processor and a robot controller that communicate through a network or bus. As used herein, the terms "computer" and "processor" both refer to devices comprising a processing unit (e.g., a central processing unit) and some form of memory (i.e., a non-transitory tangible computer-readable storage medium) for storing a program which is readable by the processing unit.

The methods described herein may be encoded as executable instructions embodied in a non-transitory tangible computer-readable storage medium, including, without limitation, a storage device and/or a memory device. Such instructions, when executed by a computer system, cause the tool-equipped unmanned aerial vehicle to perform at least a portion of the methods described herein.

In the method claims appended hereto, any alphabetic ordering of steps is for the sole purpose of enabling subsequent short-hand references to antecedent steps and not for the purpose of limiting the scope of the claim to require that the method steps be performed in alphabetic order.

The invention claimed is:

1. A method for guiding a robot having a wire gripper and at least one camera, the method comprising:
   (a) holding a portion of a wire in a wire holder of a wire holding device, wherein the wire has a wire contact disposed on one side of the wire holder;
   (b) moving the wire gripper to a location in proximity to the wire holder;
   (c) opening the wire gripper before or after step (b);
   (d) taking camera images from different viewpoints while the portion of the wire is being held, wherein the camera images include (1) an image of a portion of the wire not held by the wire holder and disposed on an opposite side of the wire holder and (2) an image of a portion of a tip of the wire gripper;
   (e) processing the camera images to generate (1) an estimate of a deviation of an orientation of the wire gripper from being parallel with the portion of the wire not held by the wire holder and (2) an estimate of a distance separating the portion of the wire not held by the wire holder from a center of the tip of the wire gripper;
   (f) controlling the robot to align the wire gripper with the portion of the wire not held by the wire holder based on the estimates generated in step (e); and
   (g) controlling the wire gripper to grip the wire while aligned with the portion of the wire not held by the wire holder.

2. The method as recited in claim 1, wherein step (f) comprises:
   controlling the robot to change the orientation of the wire gripper to match the orientation of the portion of the wire not held by the wire holder; and
   thereafter controlling the robot to change the position of the wire gripper to align with the portion of the wire not held by the wire holder.

3. The method as recited in claim 1, wherein step (e) comprises calculating, based on the camera images taken, an estimated distance separating a center of the tip of the wire gripper and the portion of the wire not held by the wire holder.

4. The method as recited in claim 3, wherein step (f) comprises controlling the robot to move the wire gripper so that the distance separating the center of the tip of the wire gripper and the portion of the wire not held by the wire holder is less than a threshold.

5. The method as recited in claim 1, further comprising:
   (h) activating the wire holding device to release the portion of the wire that was previously held; and
   (i) controlling the robot to raise the portion of the wire released in step (h) to a height above the wire holding device.

6. The method as recited in claim 1, wherein step (e) comprises:
   cropping the images;
   grayscale-filtering the cropped images by averaging across all color channels;
   detecting edges; and
   extracting a respective line representing the wire from respective camera images taken from different viewpoints.

7. The method as recited in claim 6, wherein step (e) further comprises using respective two-dimensional directions from the respective camera images to compute a three-dimensional vector representing an orientation of the wire.

8. The method as recited in claim 6, wherein step (e) further comprises:
   computing coordinates of a three-dimensional location of the tip of the wire gripper;
   computing coordinates of an optimal three-dimensional position in a plane perpendicular to the wire gripper and anchored at the tip of the wire gripper such that the tip projects closest onto longest edges in the images; and
   computing a relative position of the wire.

9. An automated system comprising:
   a robot arm comprising:
      links and joints coupled to form a kinematic chain; and
      a plurality of robot arm motors configured to drive movement of a distal end of the robot arm;
   a tool head coupled to the distal end of the robot arm and comprising a wire gripper motor;
   a wire gripper movably coupled to the tool head and operatively coupled to the wire gripper motor, wherein the wire gripper comprises a pair of gripper fingers which are configured for synchronized movements in mutually opposite directions for opening or closing the wire gripper, and wherein the gripper fingers have respective tips which form a tip of the wire gripper;
   a wire holder configured for clamping a wire;
   camera means mounted to the distal end of the robot arm and having first and second fields of view which intersect in a volume of space that includes the tip of the wire gripper and the wire holder; and
   a computer system configured to control operation of the robot arm motors and wire gripper motor, wherein the computer system is configured to perform steps comprising:
      (a) activating the camera means to take camera images from different viewpoints while a portion of a wire is being held by the wire holder, wherein the camera images include (1) an image of a portion of the wire not held by the wire holder and disposed on an opposite side of the wire holder and (2) an image of a portion of a tip of the wire gripper;
      (b) processing the camera images to generate (1) an estimate of a deviation of an orientation of the wire gripper from being parallel with the portion of the wire not held by the wire holder and (2) an estimate of a distance separating the portion of the wire not held by the wire holder from a center of the tip of the wire gripper;
      (c) controlling the robot arm motors to align the wire gripper with the portion of the wire not held by the wire holder based on the estimates generated in step (b); and
      (d) controlling the wire gripper motor to cause the wire gripper to grip the wire while aligned with the portion of the wire not held by the wire holder.

10. The automated system as recited in claim 9, wherein step (d) comprises:
   controlling the robot arm motors to change the orientation of the wire gripper to match the orientation of the portion of the wire not held by the wire holder; and
   thereafter controlling the robot arm motors to change the position of the wire gripper to align with the portion of the wire not held by the wire holder.

11. The automated system as recited in claim 9, wherein step (b) comprises calculating, based on the camera images taken, an estimated distance separating a center of the tip of the wire gripper and the portion of the wire not held by the wire holder.

12. The automated system as recited in claim 11, wherein step (d) comprises controlling the robot arm motors to move the wire gripper so that the distance separating the center of the tip of the wire gripper and the portion of the wire not held by the wire holder is less than a threshold.

13. The automated system as recited in claim 9, wherein the computer system is further configured to perform steps comprising:
   (e) activating the wire holder to release the portion of the wire that was previously held; and
   (f) controlling the robot arm motors to raise the portion of the wire released in step (e) to a height above the wire holding device.

14. A method for guiding a robot having a wire gripper and at least one camera, the method comprising:
   (a) taking camera images from different viewpoints while the wire gripper is stationary;
   (b) determining an orientation of a first portion of a wire relative to the wire gripper based on the camera images taken in step (a);
   (c) controlling the robot to rotate the wire gripper to be parallel to the first portion of the wire based on the orientation relative to the wire gripper determined in step (b);
   (d) taking camera images from different viewpoints while the wire gripper is parallel to the first portion of the wire;
   (e) calculating, based on the camera images taken in step (d), an estimated distance separating a center of a tip of the wire gripper and the first portion of the wire;
   (f) determining that the estimated distance calculated in step (e) is not less than a first threshold;
   (g) controlling the robot to move the wire gripper closer to the first portion of the wire by the estimated distance calculated in step (e);
   (h) taking camera images from different viewpoints after the wire has been moved by the estimated distance calculated in step (e);

(i) calculating, based on the camera images taken in step (h), an estimated distance separating the center of the tip of the wire gripper and the first portion of the wire;

(j) determining that the estimated distance calculated in step (i) is less than the first threshold; and (k) controlling a pair of gripper fingers of the wire gripper to move toward each other in response to step (j).

15. The method as recited in claim 14, further comprising:

holding a second portion of the wire in a wire holder of a wire holding device during performance of steps (a) through (k); and activating the wire holding device to release the second portion of the wire after the performance of step (k).

16. The method as recited in claim 15, further comprising controlling the robot to raise the second portion of the wire to a height above the wire holding device after release.

17. A method for guiding a robot having a wire gripper comprising a pair of gripper fingers and having at least one camera, the method comprising:

(a) holding a portion of a wire in a wire holder of a wire holding device, wherein the wire has a wire contact disposed on one side of the wire holder;

(b) moving the wire gripper to a predetermined location in proximity to the wire holder;

(c) opening the wire gripper by moving the gripper fingers apart either before or after step (b);

(d) subsequent to step (c), taking camera images from different viewpoints, wherein the camera images include (1) an image of a portion of the wire not held by the wire holder and disposed on an opposite side of the wire holder and (2) images of respective portions of the tips of the gripper fingers of the wire gripper in an open state;

(e) deriving, from the camera images taken in step (d) visual feedback data representing an orientation of the wire gripper relative to the portion of the wire not held by the wire holder;

(f) controlling, based on the visual feedback data derived in step (e), the robot to rotate the wire gripper so that the orientation of the wire gripper matches the orientation of the portion of the wire not held by the wire holder;

(g) subsequent to step (f), taking camera images from different viewpoints, wherein the camera images include (1) an image of the portion of the wire not held by the wire holder and (2) images of respective portions of the tips of the gripper fingers of the wire gripper in an open state;

(h) deriving, from the camera images taken in step (g), visual feedback data representing a position of a midpoint between the tips of the gripper fingers relative to the portion of the wire not held by the wire holder;

(i) controlling, based on the visual feedback data derived in step (h), the robot to move the wire gripper to a position where the gripper fingers are on opposite sides of the portion of the wire not held by the wire holder; and (j) controlling the wire gripper to cause the gripper fingers to grip the portion of the wire not held by the wire holder.

18. The method as recited in claim 17, further comprising:

(k) activating the wire holding device to release the portion of the wire that was previously held; and (l) controlling the robot to raise the portion of the wire released in step (k) to a height above the wire holding device.

19. The method as recited in claim 18, further comprising:

(m) taking camera images from different viewpoints after the portion of the wire has been released and raised, wherein the camera images include (1) an image of a portion of a nearest end of the wire contact and (2) images of respective portions of the tips of the gripper fingers of the wire gripper;

(n) calculating, based on the camera images taken in step (m), an estimated distance separating the tips of the gripper fingers of the wire gripper and the nearest end of the wire contact;

(o) controlling the robot to slide the gripper fingers toward the wire contact by the estimated distance calculated in step (n); and (p) controlling the wire gripper to tightly grip the wire subsequent to step (o).

20. The method as recited in claim 19, further comprising controlling the robot to insert the wire contact into a hole of a wire connector subsequent to step (p).

\* \* \* \* \*